(12) United States Patent
Matsuda et al.

(10) Patent No.: US 6,894,638 B2
(45) Date of Patent: May 17, 2005

(54) RADAR SIGNAL PROCESSING UNIT AND RADAR SIGNAL PROCESSING METHOD FOR ABNORMAL SIGNAL EXTRACTION

(75) Inventors: Tomoya Matsuda, Tokyo (JP); Toshio Wakayama, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 135 days.

(21) Appl. No.: 10/396,517

(22) Filed: Mar. 26, 2003

(65) Prior Publication Data

US 2004/0041725 A1 Mar. 4, 2004

(30) Foreign Application Priority Data

Aug. 28, 2002 (JP) ........................................ 2002-249336

(51) Int. Cl.$^7$ .............................................. G01S 13/95
(52) U.S. Cl. ..................... 342/26; 342/115; 342/159; 342/192; 342/195; 342/196
(58) Field of Search .................... 342/26, 159–164; 340/601; 702/3; 706/931

(56) References Cited

U.S. PATENT DOCUMENTS

| | | | |
|---|---|---|---|
| 5,157,403 A | | 10/1992 | Urkowitz |
| 5,175,551 A | * | 12/1992 | Rubin ........................... 342/26 |
| 5,262,782 A | * | 11/1993 | Rubin et al. .................. 342/26 |
| 5,563,604 A | | 10/1996 | Brandao et al. |
| 5,568,151 A | | 10/1996 | Merritt |
| 5,592,171 A | * | 1/1997 | Jordan ........................... 342/26 |
| 6,307,500 B1 | * | 10/2001 | Cornman et al. ............ 342/26 |
| 6,480,142 B1 | * | 11/2002 | Rubin ........................... 342/26 |
| 6,563,452 B1 | * | 5/2003 | Zheng et al. ................. 342/26 |

FOREIGN PATENT DOCUMENTS

| | | |
|---|---|---|
| JP | 62-100676 | 5/1987 |
| JP | 62-161070 | 7/1987 |
| JP | 62-161071 | 7/1987 |

\* cited by examiner

*Primary Examiner*—Thomas H. Tarcza
*Assistant Examiner*—Isam Alsomiri
(74) *Attorney, Agent, or Firm*—Oblon, Spivak, McClelland, Maier & Neustadt, P.C.

(57) ABSTRACT

A radar signal processing unit comprises a Fourier transform section 1 for executing Fourier transform of the received signal to a frequency signal, a frequency domain power calculation section 2 for calculating a power spectrum of electric power for each frequency from the frequency signal, an abnormal echo removal section 3 for determining the abnormal echo based on the power value of the power spectrum and outputting only the power spectrum not corresponding to the abnormal echo, an incoherent processing section 4 for performing incoherent integration of only the power spectrum not corresponding to the abnormal echo and averaging, and a signal detection section 5 for calculating the physical quantity of the atmosphere from the incoherent-integrated power spectrum.

20 Claims, 22 Drawing Sheets

RADAR SIGNAL PROCESSING UNIT AND RADAR SIGNAL PROCESSING METHOD FOR ABNORMAL SIGNAL EXTRACTION

BACKGROUND OF THE INVENTION

1. Field of the Invention

This invention relates to a radar signal processing unit and radar signal processing method of a radar for measuring the atmosphere.

2. Related Art

Information on the wind direction and the wind speed is one of the information required for weather forecasting. The most general method of measuring the wind direction and the wind speed is to install an anemoscope and an anemometer on the ground, in which case the wind only in the vicinity of the surface of the earth can be measured with the anemoscope and the anemometer on the ground. To make more precise weather forecasting, it is also necessary to know the wind direction and the wind speed in the sky; however, hitherto the wind in the sky has been able to be measured only by observation with a sonde, etc. The sonde observation has a disadvantage in that the time resolution of the observation is low (several hours or more) because only the data at the time at which the sonde is floated can be provided.

In contrast, in recent years, an art of measuring the wind direction and the wind speed in the sky by an atmospheric radar called wind profiler has been established. The wind profiler makes it possible to measure the wind direction and the wind speed in the sky every minute to every several minutes. It is expected that the wind information in the sky with such high time resolution will become useful for enhancing the accuracy of weather forecasting.

Here, the principle of measuring the atmosphere with the wind profiler will be discussed. The wind profiler is a kind of Doppler radar and generally has a configuration as shown in FIG. 20. In the figure, numeral 101 denotes an antenna, numeral 102 denotes a transmitter-receiver, numeral 103 denotes a radar signal processing unit, numeral 104 denotes a quality control processing unit, numeral 105 denotes a wind vector calculation unit, and numeral 106 denotes a display/record unit.

Next, the operation is as follows: A radio wave generated in the transmitter-receiver 102 is radiated through the antenna 101 into the air. The radio wave radiated into the air is reflected on a scattering volume produced because of the fluctuation of the refractive index of the atmosphere. The reflected radio wave is received at the antenna 101 and is input to the transmitter-receiver 102. If the scattering volume flows together with the wind in the sky, the received radio wave changes in frequency because of the Doppler effect. This frequency changes is detected as with a general Doppler radar, whereby the wind speed in the sky is detected. Specifically, the transmitter-receiver 102 amplifies, frequency-converts, and detects the received radio wave to generate a video signal and outputs the video signal to the radar signal processing unit 103, which then performs frequency analysis processing for the video signal, thereby calculating Doppler frequency, and further calculates the Doppler velocity from the Doppler frequency.

FIG. 21 is a block diagram to represent the internal configuration of the radar signal processing unit 103. In the figure, numeral 1 denotes a Fourier transform section, numeral 2 denotes a frequency domain power calculation section, numeral 4 denotes an incoherent integration section, and numeral 5 denotes a signal detection section. The Fourier transform section 1 transforms a received signal obtained for each distance from a time domain signal into a frequency domain signal. To do this, for example, Fast Fourier Transform (FFT) may be used or any other technique may be used. The frequency domain signal is input to the frequency domain power calculation section 2, which then calculates the electric power for each frequency component, thereby providing a power spectrum. The incoherent integration section 4 integrates the power spectra, thereby decreasing the fluctuations in the power spectrum. The signal detection section 5 detects the spectrum peak of atmospheric echo from the power spectrum provided by performing the incoherent integration and calculates the Doppler velocity, namely, the physical quantity of the atmosphere such as the radial wind speed from the frequency of the spectrum peak.

The quality control processing unit 104 inputs the Doppler velocity data output from the radar signal processing unit 103 and assumes the time and space continuity of the atmosphere, thereby determining that discontinuous data in the time axis and space axis directions is low-accuracy data and removing the data as missing data. Then, the quality control processing unit 104 outputs the remaining data as high-accuracy data.

The wind vector calculation unit 105 inputs the Doppler velocity data observed in different beam directions and combines the Doppler velocity data, thereby calculating a three-dimensional wind vector. FIGS. 22A and 22B schematically show the principle of calculating the wind vector. FIG. 22A shows typical beam directions when the wind speed in the sky is measured. Here, the beam is switched north, south, east and west in the zenith direction and about 10 degrees of zenith angle. FIG. 22B shows that the situation in FIG. 22A is cut on the vertical cross section parallel with an east-west direction. If a wind blows from the west to the east, the Doppler velocity in the approaching direction is observed if it is observed with the west beam and the Doppler velocity in the away direction is observed if it is observed with the east beam. The difference between the Doppler velocity observed with the west beam and the Doppler velocity observed with the east beam can be used to find the wind speed in the east-west direction. Likewise, if the north beam and the south beam are used, the wind speed in the south-north direction can be obtained. Further, the Doppler velocity in the zenith direction corresponds to the vertical component of the wind speed. Consequently, a three-dimensional wind vector can be provided.

The display/record unit 106 displays or records the wind vector data output from the wind vector calculation unit 105.

As a quality control processing system in a related art, a quadric surface approximation system proposed in an article about "Wind profiler" in a book called Sokkou Jihou 65.3, 1998 is available. FIG. 23 is a block diagram to show the configuration of a quality control processing unit to implement the quadric surface approximation system. In the figure, numeral 401 denotes an approximate surface definition range setting section, numeral 402 denotes an approximate quadric surface calculation section, numeral 403 denotes an approximate accuracy determination section, and number 404 denotes a data removal section.

Next, the operation of the quality control processing unit shown in FIG. 23 will be discussed. The approximate surface definition range setting section 401 sets the time range and the distance range for defining an approximate quadric surface when a quadric surface is fitted to measurement data. The approximate quadric surface calculation section 402 fits the quadric surface to input data in the time range and the distance range set by the approximate surface definition range setting section 401. To fit the quadric surface, for example, a least square method is used.

The approximate accuracy determination section 403 determines whether or not the accuracy of the approximate quadric surface calculated by the approximate quadric surface calculation section 402 is high. For example, in the document mentioned above, the difference between the measurement value at the grid point at each time and distance and the approximate quadric surface is calculated and if the maximum value of the difference is greater than a preset threshold value or if the square root of the root mean square of the differences in the approximate surface definition range is greater than a preset threshold value, the accuracy of the approximate quadric surface is determined low.

If the accuracy of the approximate quadric surface is low, the Doppler velocity data and the approximate quadric surface are input to the data removal section 404, which then removes the Doppler velocity data as missing data at the grid point where the difference between the approximate quadric surface and the Doppler velocity data is large. The Doppler velocity data subjected to the data removal processing in the data removal section 404 is input to the approximate quadric surface calculation section 402, which again fits the quadric surface to input data. Such process is repeated until the approximate accuracy determination section 403 determines that the accuracy of the approximate quadric surface is high.

If the approximate accuracy determination section 403 determines that the accuracy of the approximate quadric surface is high, it outputs the Doppler velocity data at this point in time as the data already undergoing the quality control processing. Then, the approximate surface definition range setting section 401 updates the definition range of the approximate surface to the next order or the next time and repeats the same process.

The quality control processing according to the quadric surface approximation system as described above operates well if the number of grid points where the data quality is degraded is small. For example, if one bird only exists in the sky above a radar, the Doppler velocity corresponding to the move speed of the bird is observed only at one point of the space-time coordinates and the Doppler velocity corresponding to the wind, namely, the radial wind speed is observed at other points. Therefore, the quality control processing unit previously described with reference to FIG. 23 can be used to remove only the bird echo.

However, if a large number of birds come flying consecutively in time sequence, the number of grid points where the data quality is degraded is increased. Then, in the space-time coordinates, migratory bird echo is detected more prominently than the atmospheric echo. In this case, it becomes difficult to remove an abnormal echo by the quality control processing unit in the related art as previously described with reference to FIG. 23. Such a situation frequently occurs when a season wherein migratory birds move all together comes.

Since the radar beam is thin, the time for the bird to pass through the beam is limited. Therefore, a bird echo is received intermittently in time sequence. In the time when the bird echo is broken, only the atmospheric echo can be received. However, since the radar cross section of bird is large as compared with that of the atmosphere, if integration processing of integrating data in the time direction is performed, only the bird echo with large radar cross section is prominent and the atmospheric echo is buried. Accordingly, bird echo appears continuously in time sequence in the data after undergoing signal processing.

SUMMARY OF THE INVENTION

It is therefore an object of the invention to make it possible to remove only abnormal echoes occurring as a large number of birds pass through the sky and leave atmospheric echo data when atmospheric observation is conducted with a radar, thereby precisely conducting atmospheric observation of wind speed measurement, etc.

According to the invention as in aspect 1, there is provided a radar signal processing unit applied to a radar for removing an abnormal echo from a received signal and measuring the physical quantity of the atmosphere, the radar signal processing unit comprising a Fourier transform section for executing Fourier transform of the received signal to a frequency signal, a frequency domain power calculation section for calculating a power spectrum of electric power for each frequency from the frequency signal, an abnormal echo removal section for determining the abnormal echo based on the power value of the power spectrum and outputting only the power spectrum not corresponding to the abnormal echo, an incoherent processing section for performing incoherent integration of only the power spectrum not corresponding to the abnormal echo and averaging, and a signal detection section for calculating the physical quantity of the atmosphere from the incoherent-integrated power spectrum.

In the radar signal processing unit as in aspect 2, the abnormal echo removal section uses the integration value of power spectrum on a frequency axis as the power value of the power spectrum and if the integration value exceeds a threshold value, the abnormal echo removal section determines that an abnormal echo is included, and outputs only the power spectrum not corresponding to the abnormal echo.

In the radar signal processing unit as in aspect 3, the power value of the power spectrum is the integration value of power spectrum on the frequency axis except for a frequency range in which a ground echo component is prominent.

In the radar signal processing unit as in aspect 4, the power value of the power spectrum is the integration value of power spectrum on the frequency axis except for components of frequency 0.

In the radar signal processing unit as in aspect 5, the abnormal echo removal section uses the peak value of power spectrum as the power value of the power spectrum and if the peak value exceeds a threshold value, the abnormal echo removal section determines that an abnormal echo is included, and outputs only the power spectrum not corresponding to the abnormal echo.

According to the invention as in aspect 6, there is provided a radar signal processing unit applied to a radar for removing an abnormal echo from a received signal and measuring the physical quantity of the atmosphere, the radar signal processing unit comprising a time domain power calculation section for calculating total electric power of the received signal in a given time range, an abnormal echo removal section for determining that the received signal in the time range is an abnormal echo and outputting the received signal not corresponding to the abnormal echo if the total electric power exceeds a threshold value, a Fourier transform section for executing Fourier transform of the received signal not corresponding to the abnormal echo to a frequency signal, a frequency domain power calculation section for calculating a power spectrum of electric power for each frequency from the frequency signal, an incoherent processing section for performing incoherent integration of the power spectrum and averaging, and a signal detection section for calculating the physical quantity of the atmosphere from the incoherent-integrated power spectrum.

The radar signal processing unit as in aspect 7 comprises a threshold value setting section for setting a threshold value used for making an abnormal echo determination in response to a date or time condition, wherein the setup threshold value is used to make an abnormal echo removal determination.

In the radar signal processing unit as in aspect 8, whether or not abnormal echo removal processing is to be performed can be specified in response to a date or time condition.

In the radar signal processing unit as in aspect 9, the date or time condition is a season in which a large number of migratory birds come flying and nighttime.

The radar signal processing unit as in aspect 10 comprises a threshold value setting section for setting a threshold value used for making an abnormal echo determination in response to rainfall strength, wherein the setup threshold value is used to make an abnormal echo removal determination.

In the radar signal processing unit as in aspect 11, whether or not abnormal echo removal processing is to be performed can be specified in response to rainfall strength.

In the radar signal processing unit as in aspect 12, the signal detection section calculates the wind speed in a vertical direction and the threshold value for the abnormal echo determination is changed in response to the wind speed value.

In the radar signal processing unit as in aspect 13, the presence of a rainfall is determined based on the wind speed in a vertical direction calculated by the signal detection section and if a rainfall exists, abnormal echo removal processing is not performed.

According to the invention as in aspect 14, there is provided a radar signal processing method applied to a radar for removing an abnormal echo from a received signal and measuring the physical quantity of the atmosphere, the radar signal processing method comprising a first step of extracting a signal in one time range from the received signal obtained at each distance and executing Fourier transform, thereby transforming the signal into frequency domain data, a second step of calculating the power value for each frequency with respect to the frequency domain data provided in the first step and finding a power spectrum, a third step of integrating electric power of the power spectrum at each distance on a frequency axis, thereby calculating total electric power of the signal, a fourth step of determining that an abnormal echo is mixed in the signal if the total electric power exceeds a preset threshold value for each distance, a fifth step of performing incoherent integration using only power spectra applied if it is determined that an abnormal echo is not mixed, of the power spectra at a plurality of times provided by executing the first step to the fourth step at the plurality of times, and a sixth step of detecting an atmospheric echo from the power spectrum after undergoing the incoherent integration, provided in the fifth step and calculating the physical quantity of the atmosphere.

In the radar signal processing unit as in aspect 15, the third step is to integrate the electric power of the power spectrum on the frequency axis in the frequency range except for a fixed clutter area of a ground echo component at each distance, thereby calculating the total electric power of the signal except fixed clutter electric power.

According to the invention as in aspect 16, there is provided a radar signal processing method applied to a radar for removing an abnormal echo from a received signal and measuring the physical quantity of the atmosphere, the radar signal processing method comprising a first step of extracting a signal in one time range from the received signal obtained at each distance and executing Fourier transform, thereby transforming the signal into frequency domain data, a second step of calculating the power value for each frequency with respect to the frequency domain data provided in the first step and finding a power spectrum, a third step of calculating peak electric power of the power spectrum at each distance, a fourth step of determining that an abnormal echo is mixed in the signal if the peak electric power exceeds a preset threshold value for each distance, a fifth step of performing incoherent integration using only power spectra applied if it is determined that an abnormal echo is not mixed, of the power spectra at a plurality of times provided by executing the first step to the fourth step at the plurality of times, and a sixth step of detecting an atmospheric echo from the power spectrum after undergoing the incoherent integration, provided in the fifth step and calculating the physical quantity of the atmosphere.

According to the invention as in aspect 17, there is provided a radar signal processing method applied to a radar for removing an abnormal echo from a received signal and measuring the physical quantity of the atmosphere, the radar signal processing method comprising a first step of extracting a signal in one time range from the received signal obtained at each distance and executing Fourier transform, thereby transforming the signal into frequency domain data, a second step of calculating the power value for each frequency with respect to the frequency domain data provided in the first step and finding a power spectrum, a third step of integrating electric power of the power spectrum at each distance on a frequency axis, thereby calculating total electric power of the signal, a fourth step, if the maximum value of the total electric power provided at each distance exceeds a preset threshold value, the fourth step of determining that power spectrum data at all attitudes at the time is to be unused, a fifth step of performing incoherent integration using only power spectra applied if it is determined that an abnormal echo is not mixed, of the power spectra at a plurality of times provided by executing the first step to the fourth step at the plurality of times, and a sixth step of detecting an atmospheric echo from the power spectrum after undergoing the incoherent integration, provided in the fifth step and calculating the physical quantity of the atmosphere.

According to the invention as in aspect 18, there is provided a radar signal processing method applied to a radar for removing an abnormal echo from a received signal and measuring the physical quantity of the atmosphere, the radar signal processing method comprising a first step of extracting a signal in one time range from the received signal obtained at each distance and executing Fourier transform, thereby transforming the signal into frequency domain data, a second step of calculating the power value for each frequency with respect to the frequency domain data provided in the first step and finding a power spectrum, a third step of calculating the peak power value of the power spectrum at each distance, a fourth step, if the maximum value of the peak power values provided at the distances exceeds a preset threshold value, the fourth step of determining that power spectrum data at all attitudes at the time is to be unused, a fifth step of performing incoherent integration using only power spectra applied if it is determined that an abnormal echo is not mixed, of the power spectra at a plurality of times provided by executing the first step to the fourth step at the plurality of times, and a sixth step of detecting an atmospheric echo from the power spectrum after undergoing the incoherent integration, provided in the fifth step and calculating the physical quantity of the atmosphere.

In the radar signal processing unit as in aspect 19, the power values of the power spectra provided at a plurality of times are compared with each other, any other power value than at the time having a relatively high power value is extracted, and the extracted power value is multiplied by a predetermined coefficient, thereby providing the threshold value used for abnormal echo determination.

In the radar signal processing unit as in aspect 20, the minimum power value of the total electric power or the peak electric power calculated from the power spectra provided at a plurality of times within a given time period at each distance is extracted as the electric power of an atmospheric echo and the value resulting from multiplying the extracted minimum power value by a preset coefficient is set as the threshold value.

DETAILED DESCRIPTION OF THE PREFERRED EMBODIMENTS (First Embodiment)

Figure 1:
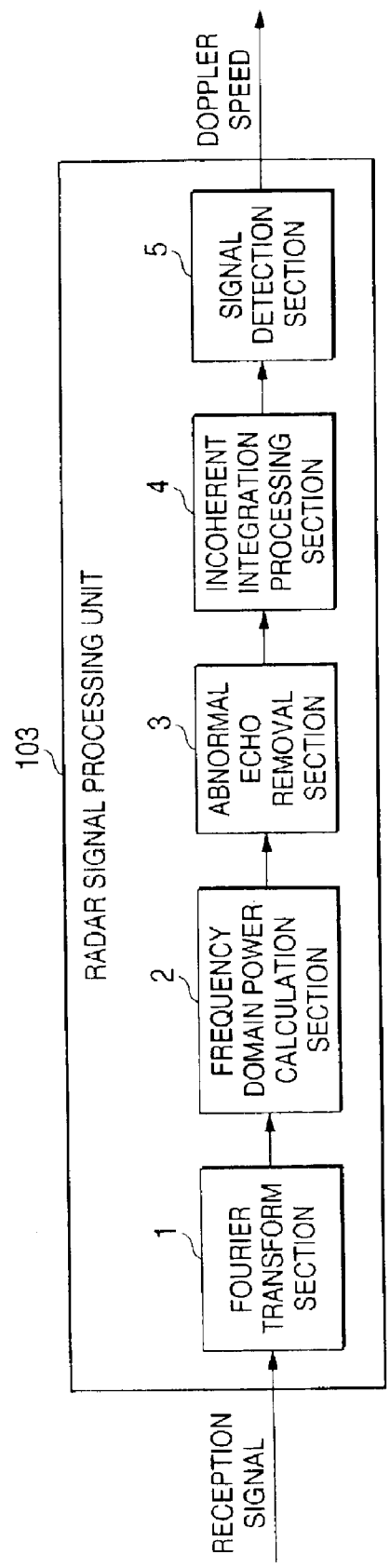
FIG. 1 is a block diagram to show the configuration of a radar signal processing unit of a first embodiment of the invention.

FIG. 1 is a block diagram to show the configuration of a radar signal processing unit of a first embodiment of the invention. In the figure, numeral 1 denotes a Fourier transform section, numeral 2 denotes a frequency domain power calculation section, numeral 3 denotes an abnormal echo removal section, numeral 4 denotes an incoherent integration section, and numeral 5 denotes a signal detection section.

Next, the operation is as follows: The Fourier transform section 1 transforms a received signal obtained for each distance from a time domain signal into a frequency domain signal. To do this, for example, Fast Fourier Transform (FFT) may be used or any other technique may be used. The frequency domain signal is input to the frequency domain power calculation section 2, which then calculates the electric power for each frequency component, thereby providing a power spectrum.

If the power value of a power spectrum provided by the frequency domain power calculation section 2 is greater than a setup threshold value, the abnormal echo removal section 3 determines that an abnormal echo is mixed, and removes the power spectrum determined to be mixed with the abnormal echo. The incoherent integration section 4 integrates the remaining power spectra not removed by the abnormal echo removal section 3, thereby decreasing the fluctuations in the power spectrum. The signal detection section 5 detects the spectrum peak of atmospheric echo from the power spectrum provided by performing the incoherent integration and calculates the Doppler velocity, namely, the radial wind speed from the frequency of the spectrum peak.

As a method of removing the power spectrum in the abnormal echo removal section 3, it is possible to assume the power spectrum to be removed to be a loss, namely, set a flag of "removal." The incoherent integration section 4 uses only the power spectra with no flag of "removal" to perform integration processing. As an alternative method of removing the power spectrum in the abnormal echo removal section 3, it is also possible to set the power values of the power spectra to be removed all to 0. In this case, if the incoherent integration section 4 performs integration processing without considering whether or not the power spectra are removed in the abnormal echo removal section 3, the abnormal echo can be removed consequently.

Figure 2:
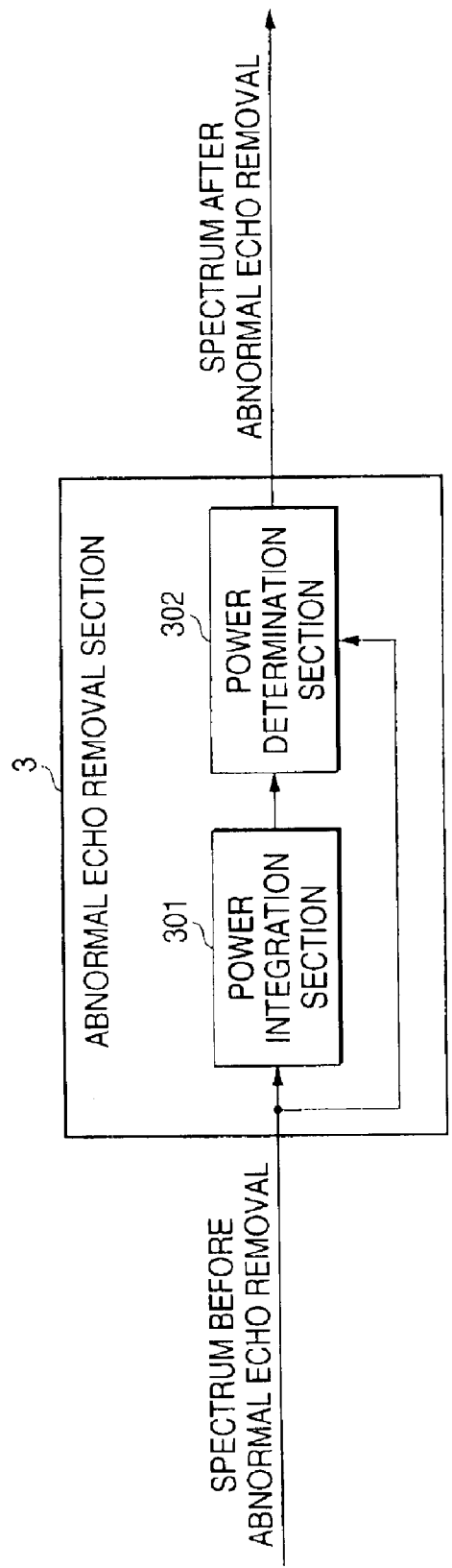
FIG. 2 is a block diagram to show the configuration of an abnormal echo removal section of the radar signal processing unit of the first embodiment of the invention.

As the power value of power spectrum used for abnormal echo determination, it is possible to use total electric power provided by integrating power spectra on a frequency axis, for example. FIG. 2 is a block diagram to show the internal configuration of the abnormal echo removal section 3 in such a case. In the figure, numeral 301 denotes a power integration section and numeral 302 denotes a power determination section. The power integration section 301 integrates power spectra on the frequency axis, thereby calculating the total electric power of the power spectra. The power determination section 302 compares the total electric power calculated by the power integration section 301 with a preset threshold value. If the total electric power is greater than the preset threshold value, the power determination section 302 determines that the power spectrum contains an abnormal echo component, and removes the power spectrum. In contrast, if the total electric power is smaller than the preset threshold value, the power determination section 302 outputs the power spectrum intact to the incoherent integration section 4.

However, in near data, the electric power of a ground echo component may be large. Since the ground echo component exists only in the proximity of frequency 0 and the spectrum width is also clearly narrow as compared with atmospheric echo, it is comparatively easy to discriminate both from each other. Since the signal detection section 5 also usually often removes the effect of a ground echo, the abnormal echo removal section 3 may remove any abnormal echo other than the ground echo, namely, only bird echo. In this case, the power integration section 301 may integrate power spectra in the frequency range except in the proximity of frequency 0.

Figure 3:
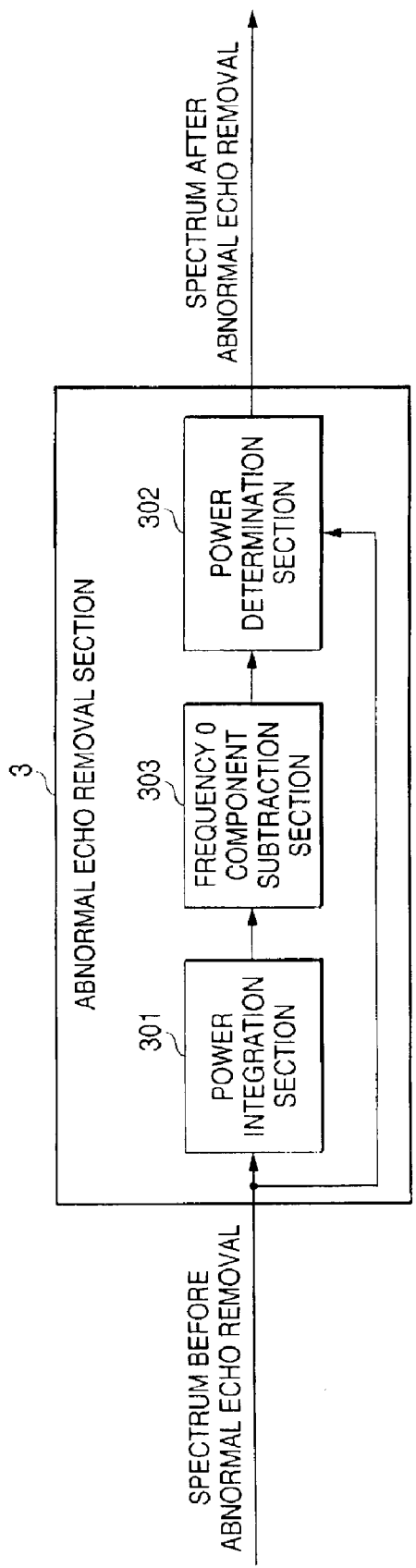
FIG. 3 is a block diagram to show the configuration of another abnormal echo removal section of the radar signal processing unit of the first embodiment of the invention.

The easiest method of removing the ground echo component is to remove only the frequency 0 component and find the integration value of power spectra. FIG. 3 is a diagram to show the configuration of an abnormal echo removal section for performing such operation. In the figure, numeral 303 denotes a frequency 0 component subtraction section. Sections identical with those previously described with reference to FIG. 2 are denoted by the same reference numerals in FIG. 3. The frequency 0 component subtraction section 303 subtracts the frequency 0 component from the electric power value provided by integrating power spectra in all frequency range by the power integration section 301, whereby the power integration value with the frequency 0 component removed can be provided.

Figure 4:
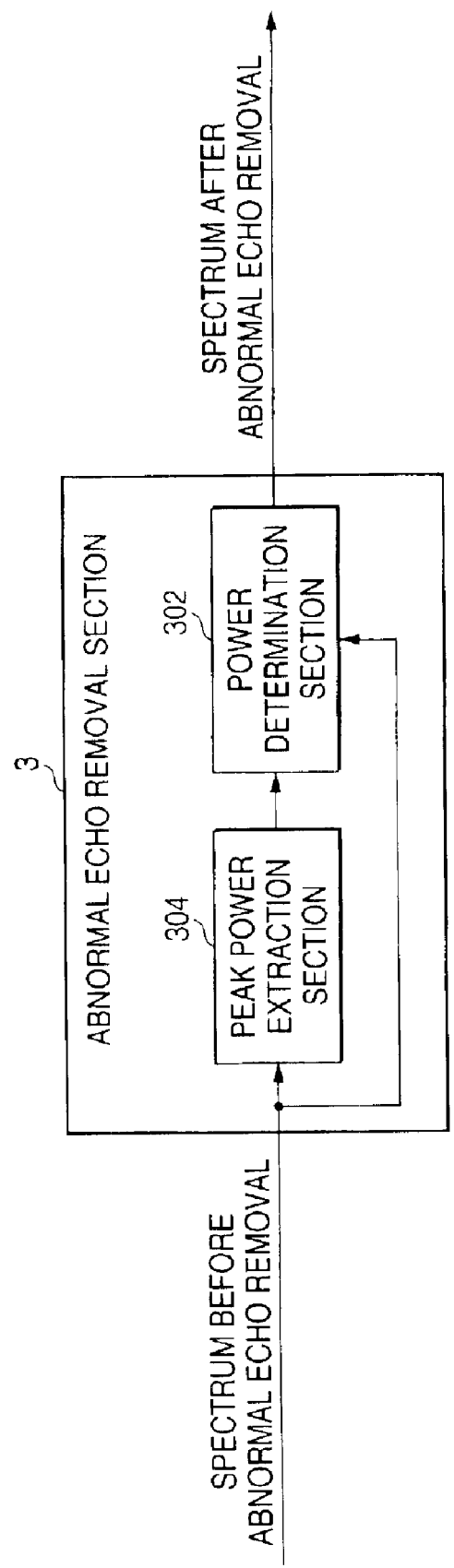
FIG. 4 is a block diagram to show the configuration of another abnormal echo removal section of the radar signal processing unit of the first embodiment of the invention.

The example of using the electric power provided by integrating power spectra to make abnormal echo determination has been shown. FIG. 4 is a block diagram to show the internal configuration of abnormal echo removal section 3 for using the peak power value to make determination. In the figure, numeral 304 denotes a peak power extraction section. The peak power extraction section 304 extracts the maximum power value in power spectrum and assumes the value to be a representative value of signal power, and power determination section 302 makes an abnormal echo determination.

Figure 5:
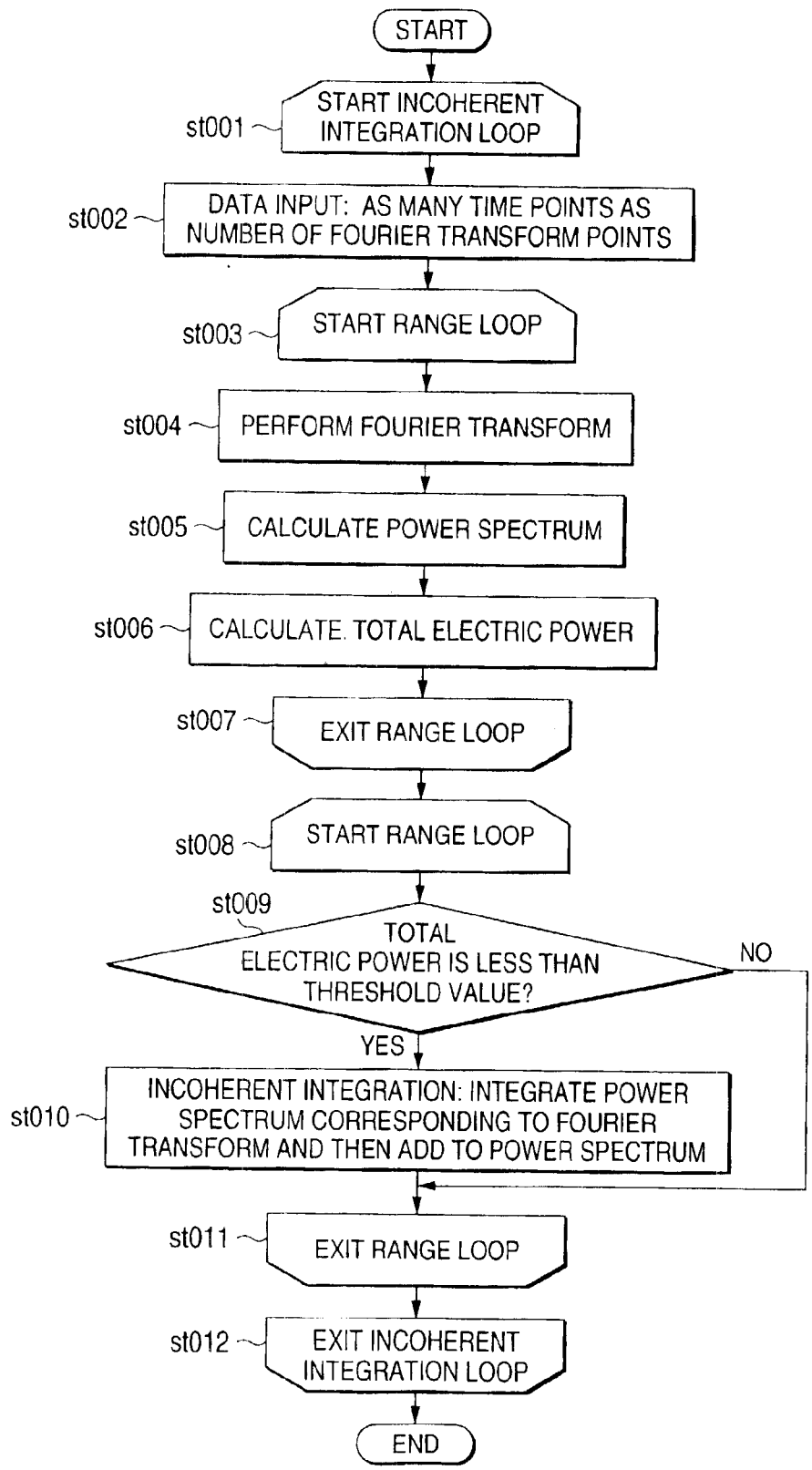
FIG. 5 is a flowchart to show a flow of a radar signal processing method of the first embodiment of the invention.

FIG. 5 is a flowchart to show a flow of a radar signal processing method of the first embodiment of the invention. It shows a flow of a radar signal processing method for integrating power spectra on a frequency axis, namely, corresponding to the operation of the abnormal echo removal section in FIG. 2 or FIG. 3.

The section surrounded by steps st001 and st012 represents a loop for performing incoherent integration. At step 002, as many received signals as the number of time points when Fourier transform is performed is input. The section surrounded by steps st003 to st007 represents a range loop, namely, a loop for performing processing at each distance. At st004, at each distance, Fourier transform is conducted for the received signal of a time series signal, thereby transforming the signal into a frequency domain signal. At st005, the power value is calculated for each frequency component, thereby providing a power spectrum. At st006, the power spectrum is integrated on the frequency axis, thereby calculating the total electric power. The integrating on the frequency axis may be performed in the frequency domain except in the proximity of frequency 0 as in the operation of the abnormal echo removal section 3 in FIG. 2 or may be performed with only the frequency 0 component removed as in the operation of the abnormal echo removal section 3 in FIG. 3.

The section surrounded by steps st008 to st011 represents a range loop, namely, a loop for performing processing at each distance. At step st009, for each distance, the total electric power is compared with a preset threshold value and only if the total electric power falls below the preset threshold value, the power spectrum being processed is integrated at step st010. The incoherent integration loop is exited when the process from st002 to st011 is performed as many times as the setup count Nin. In this case, the number of power spectra integrated at st010, namely, the number of incoherent integrations becomes Nin at the maximum. If the effect of an abnormal echo is received, the number of incoherent integrations becomes less than Nin. If the incoherent integration loop is executed as many times as the setup count Nin, the time interval of providing power spectrum after the incoherent integration becomes stable regardless of the number of incoherent integrations actually executed, so that handing the input data is facilitated to perform data processing at the later stage of signal processing of data quality control processing, etc., by the quality control processing unit. However, as the number of incoherent integrations becomes small, the performance of signal detection is degraded accordingly.

Alternatively, if the number of incoherent integrations becomes equal to or greater than a predetermined number, the incoherent integration loop may be exited at st012. In this case, the number of incoherent integrations can always be made constant or more and thus constant or higher signal detection performance can always be provided.

In FIG. 5, the two range loops of step st001 to step st007 and step st008 to step st011 are provided, but may be collected into one. Alternatively, if the processing is equivalent, the range loop may be subdivided. Thus, if the processing is equivalent, the invention does not limit any loop separation method.

Figure 6:
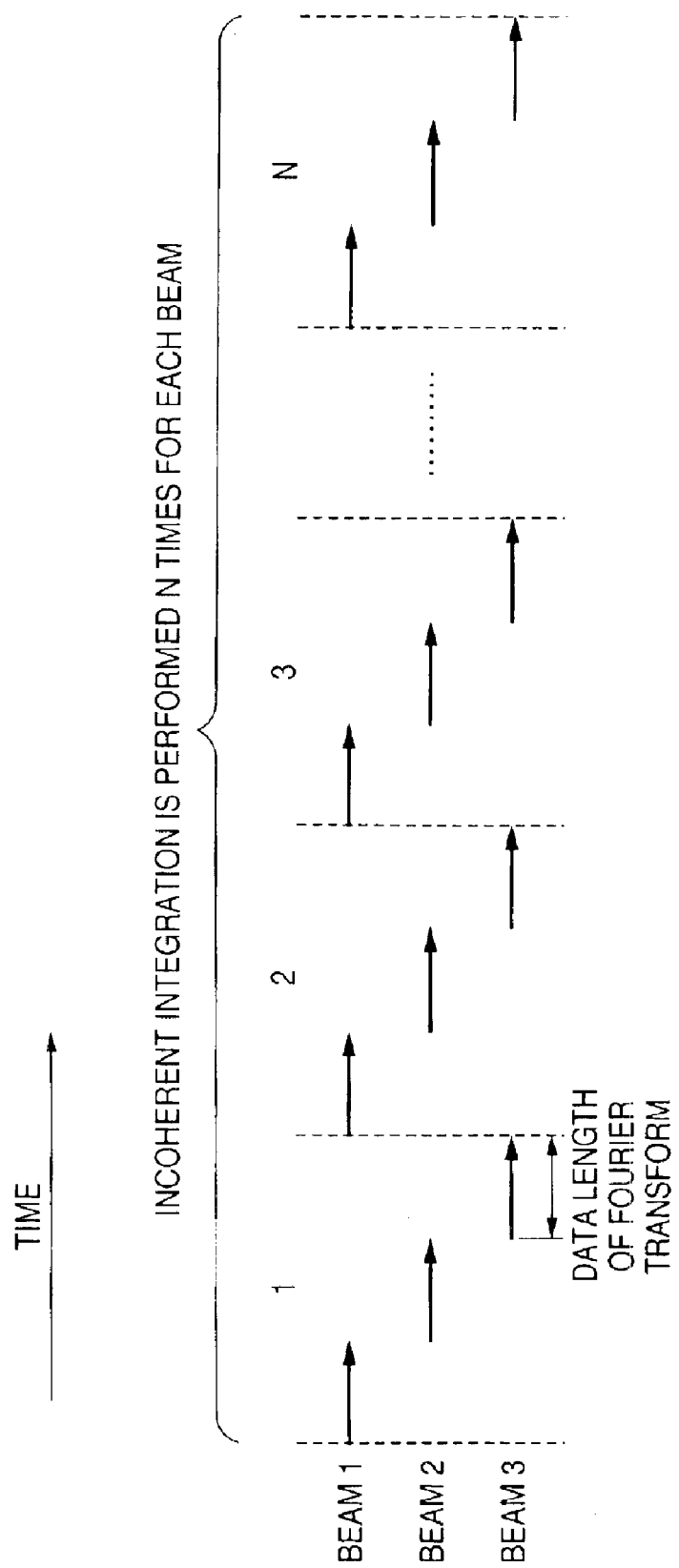
FIG. 6 is a drawing to show a typical observation procedure in wind speed observation.

In the flowchart to show the flow of the radar signal processing method of the invention (FIG. 5), switching of the beam direction of radar is not represented. In the actual radar, a procedure of switching the beam at an intermediate point of the time range performing incoherent integration is often taken in such a manner that when Fourier transform terminates in one time range, the beam direction is switched to the next for covering all necessary observation directions, for example, as shown in FIG. 6. Also in such a case, if attention is focused only on the data in each beam direction, the processing flow in FIG. 5 does not change. Therefore, in the invention, such a beam switching procedure is not limited.

The threshold value used with the abnormal echo determination may be fixedly set considering the radar cross section of the atmosphere and the radar cross section of bird. Generally, the radar cross section of bird is sufficiently large as compared with the radar cross section of the atmosphere. Then, the power value between the received power of the atmospheric echo predicted from a radar equation and the received power of the bird echo may be adopted as the threshold value.

Figure 7:
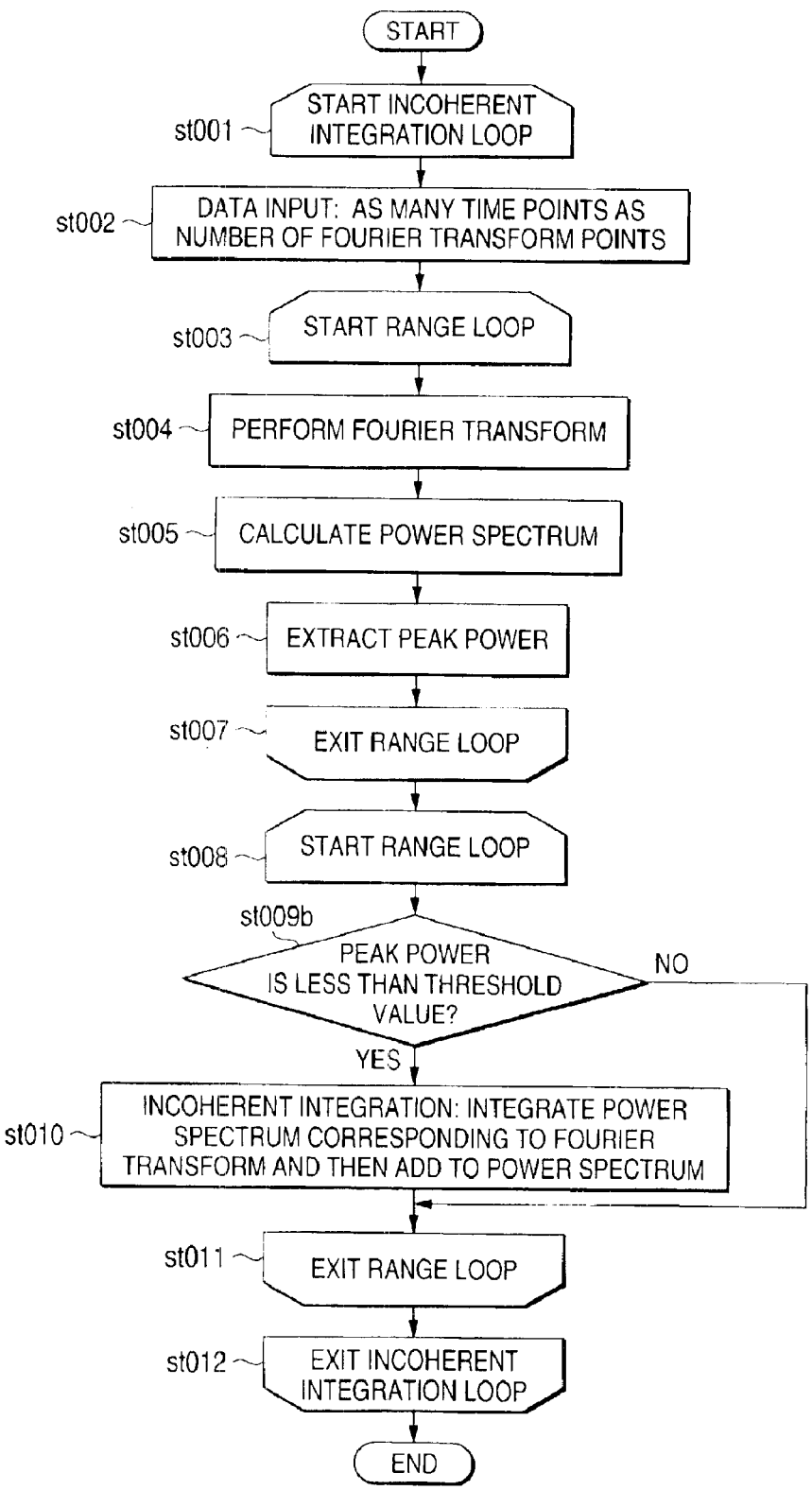
FIG. 7 is a flowchart to show a flow of another radar signal processing method of the first embodiment of the invention.

FIG. 7 is a flowchart to show a flow of a radar signal processing method for making an abnormal echo determination using the peak power of power spectrum, namely, corresponding to the operation of the abnormal echo removal section in FIG. 4. The radar signal processing method in FIG. 7 is the same as that previously described with reference to FIG. 5 except that the peak power of power spectrum is extracted at step 006b and is compared with a threshold value for determination at step 009b As described above, in the embodiment of the invention, the abnormal echo and the atmospheric echo are discriminated from each other based on the echo strength and only the atmospheric echo is used to make signal detection, so that it is made possible to precisely conduct atmospheric observation if migratory birds come flying in the sky. Particularly, an abnormal echo is removed for the data before undergoing the incoherent integration and thus the time unit for performing processing of abnormal echo removal is short as compared with that in the radar signal processing unit or the quality control processing unit in the related art, so that in a situation in which an abnormal echo occurs intermittently, it is made possible to remove the abnormal echo and leave only the normal echo before the normal echo is buried in the abnormal echo.

Since the power value on the frequency domain calculated to calculate power spectrum is used, it becomes unnecessary to calculate the power value in the time domain as compared with a seventh embodiment described later, so that the signal processing calculation amount may be smaller than that in the seventh embodiment.

In the first embodiment, the radar signal processing unit and the radar signal processing method designed for application to a wind speed measurement radar have been described. However, the radar signal processing unit and the radar signal processing method can be applied not only to radars for transmitting and receiving radio waves, but also to radars for transmitting and receiving sound waves and laser radars for transmitting and receiving light waves. They can be applied not only to radars intended for wind speed measurement, but also to atmospheric observations radars including a rainfall radar. This also applies to other embodiments described later.

(Second Embodiment)

In the first embodiment, abnormal echo determination and abnormal echo removal are executed for each distance. Next, an embodiment wherein abnormal echo determination and abnormal echo removal are executed in batch in all ranges will be discussed as a second embodiment of the invention. In the second embodiment, the configuration of a radar signal processing unit is the same as that previously described with reference to FIG. 1 in the first embodiment, but the first and second embodiments differ in radar signal processing method.

Figure 8:
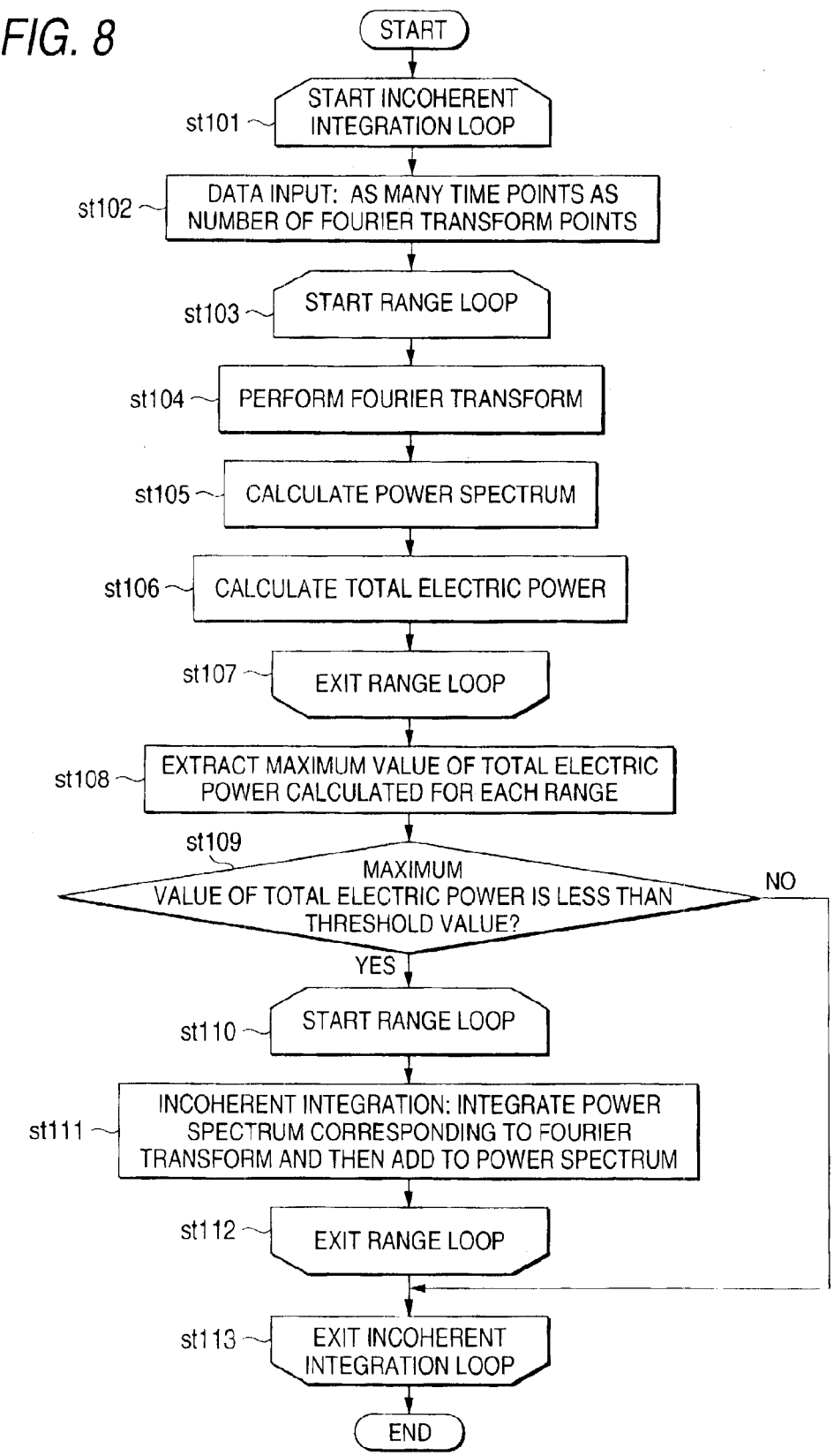
FIG. 8 is a flowchart to show a flow of a radar signal processing method of a second embodiment of the invention.

FIG. 8 shows a flow of a radar signal processing method of the second embodiment of the invention. The section surrounded by steps st101 and st113 represents a loop for performing incoherent integration. At step 102, as many received signals as the number of time points when Fourier transform is performed is input. The section surrounded by steps st103 to st107 represents a range loop, namely, a loop for performing processing at each distance. At st104, at each distance, Fourier transform is conducted for the received signal of a time series signal, thereby transforming the signal into a frequency domain signal. At st105, the power value is calculated for each frequency component, thereby calculating a power spectrum. At st106, the power spectrum is integrated on the frequency axis, thereby calculating the total electric power. The integrating on the frequency axis may be performed in the frequency domain except in the proximity of frequency 0 as in the operation of the abnormal echo removal section 3 in FIG. 2 or may be performed with only the frequency 0 component removed as in the operation of the abnormal echo removal section 3 in FIG. 3. At step st108, the maximum value of the total electric power calculated for each range at step st106 is extracted. At step st109, the maximum value of the total electric power provided at step st108 is compared with a preset threshold value and only if the maximum value of the total electric power is smaller than the threshold value, the process of a range loop represented at step st110 to step st112 is executed. At step st111 in the range loop, the power spectrum provided at step st105 is integrated and then is added to power spectrum, thereby executing incoherent integration.

Thus, in the radar signal processing method in FIG. 8, if it is determined at step st109 that an abnormal echo is mixed in the received signal, power spectrum integration is skipped at all distances and thus abnormal echoes are removed in batch at all distances.

Figure 9:
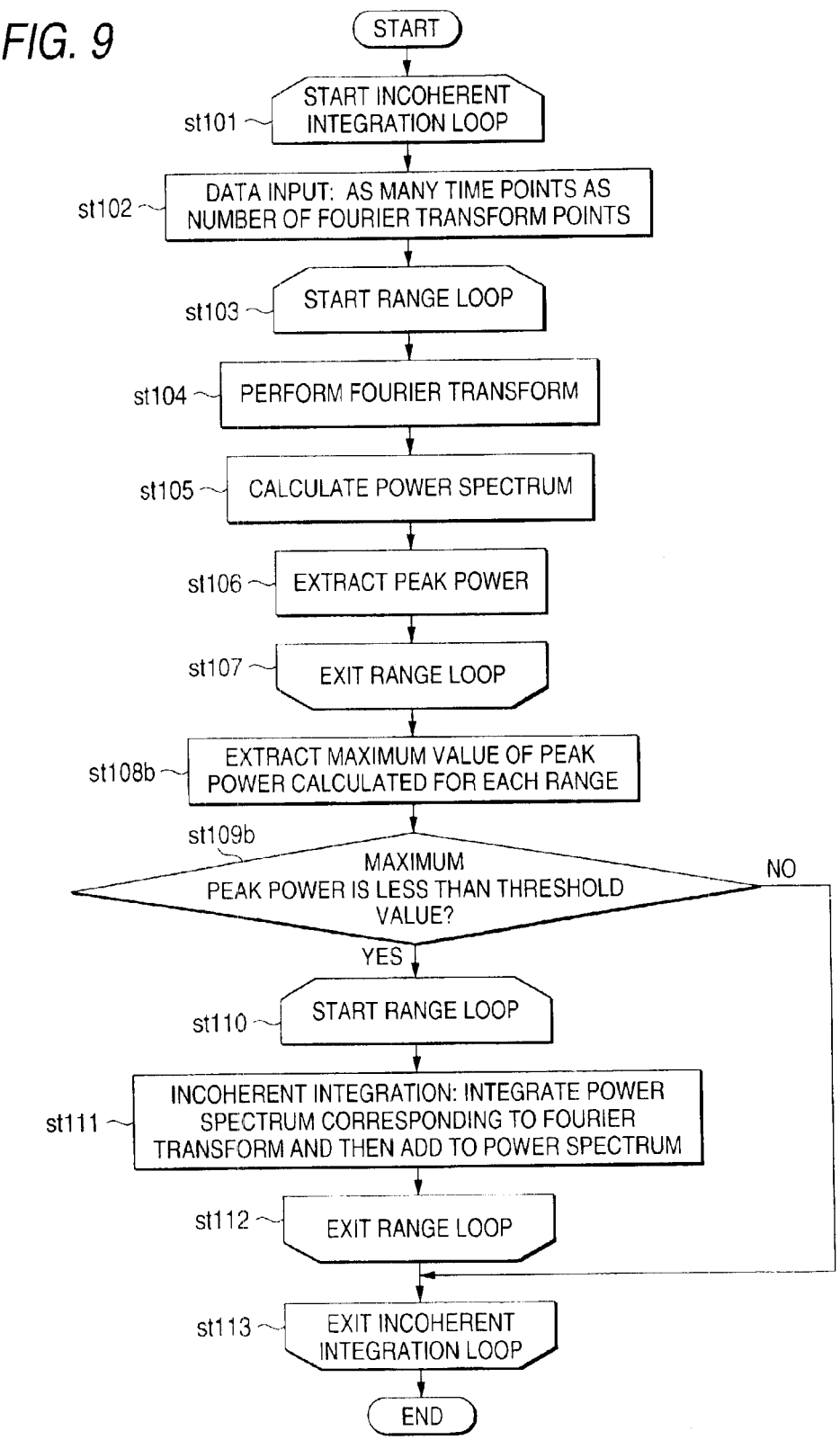
FIG. 9 is a flowchart to show a flow of another radar signal processing method of the second embodiment of the invention.

In FIG. 8, abnormal echo determination is made for the total electric power, while it is also possible to make abnormal echo determination for the peak power as in FIG. 9, which is a flowchart to show a flow of a radar signal processing method corresponding to the operation of the abnormal echo removal section in FIG. 4. The radar signal processing method in FIG. 9 is the same as that previously described with reference to FIG. 8 except that the peak power of power spectrum is extracted at step 106b and the maximum value of the peak power is extracted at step 108b and is compared with a threshold value for determination at step 109b.

According to the radar signal processing method of the second embodiment of the invention, abnormal echo determination is made in batch at all distances and thus the operation time can be shortened as compared with that for making abnormal echo determination for each distance. The method is effective particularly if the performance of signal processing hardware is limited as the abnormal echo removal function is added to an already used radar signal processing unit.

(Third Embodiment)

In the described embodiments, the threshold value used for abnormal echo determination is fixed. In a third embodiment of the invention, a threshold value is determined from observation data. The third embodiment will be discussed.

Figure 10:
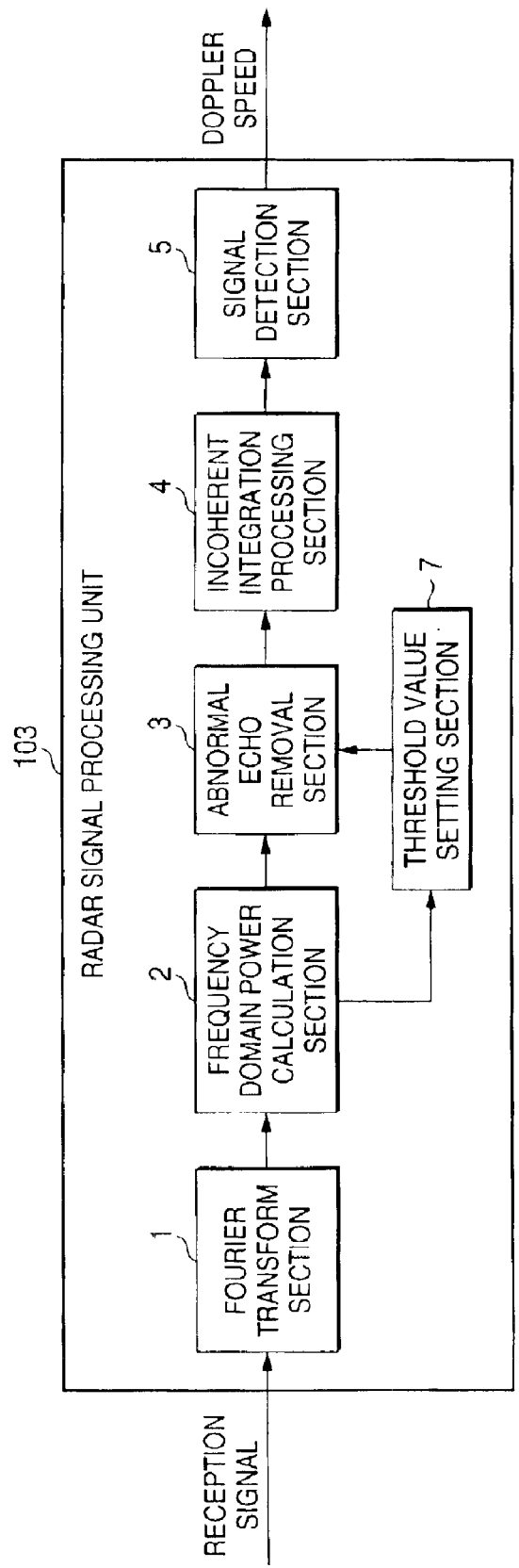
FIG. 10 is a block diagram to show the configuration of a radar signal processing unit of a third embodiment of the invention.

FIG. 10 is a block diagram to show the configuration of a radar signal processing unit in the third embodiment of the invention. In the figure, numeral 7 denotes a threshold value setting section. Parts identical with those previously described with reference to FIG. 1 are denoted by the same reference numerals in FIG. 10. Next, the operation is as follows: The threshold value setting section 7 inputs power spectrum data at each distance provided by a frequency domain power calculation section 2 and accumulates the power spectrum data as much as a plurality of times. The threshold value setting section 7 extracts the data determined to contain no abnormal echo from among the accumulated power spectra for each range and sets a threshold value for abnormal echo determination based on the power value. Specifically, the data of the time determined to contain no abnormal echo from the power value is selected and the power value resulting from adding a margin to the power value by a predefined method is output to an abnormal echo removal section 3 as the abnormal echo determination threshold value. The abnormal echo removal section 3 uses the threshold value to evaluate the power spectrum output from the frequency domain power calculation section 2, and removes the data determined to contain an abnormal echo component. In other points, the operation of the radar signal processing unit is the same as that of the radar signal processing unit previously described with reference to FIG. 1.

Next, the operation of the radar signal processing unit in FIG. 10 will be discussed from the viewpoint of a processing algorithm. The processing algorithm in the third embodiment other than the threshold value setting method is the same as the radar signal processing method of the first or second embodiment. Here, only setting of the threshold value used for abnormal echo determination in the algorithm of the radar signal processing method will be discussed.

Figure 11:
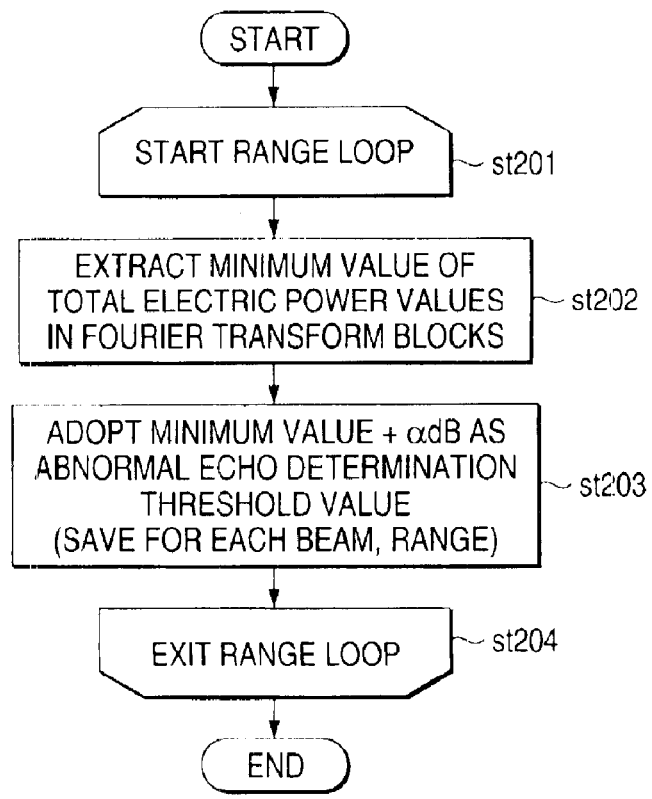
FIG. 11 is a flowchart to show a flow of a threshold value setting algorithm in a radar signal processing method of the third embodiment of the invention.

FIG. 11 is a flowchart to show a flow of setting of an abnormal echo determination threshold value in the radar signal processing method of the third embodiment of the invention. In the figure, the section surrounded by steps st201 to st204 represents a range loop, namely, a loop for performing processing at each distance.

For example, in FIG. 5 in the first embodiment in the process from step st003 to st007, Fourier transform and power spectrum calculation for each range are performed in a plurality of time blocks, whereby in each range, power spectrum and total electric power values at a plurality of times are provided.

At st202 in FIG. 11, the minimum value is extracted from the total electric power values at a plurality of times. It is considered that the possibility that an abnormal echo caused by birds may be mixed is the lowest at the time at which the minimum electric power value is set. Then, assuming that the observation data at the time at which the minimum value of the total electric power values is provided is a sample of the data containing no abnormal echo, at step st203, the electric power value resulting from multiplying the minimum value by one coefficient is set as the threshold value for abnormal echo determination. As the value of the coefficient, a fixed value may be set empirically. Alternatively, considering the statistical nature of the electric power values of atmospheric echo, namely, probability density distribution, the threshold value may be set so that the probability that the atmospheric echo containing no abnormal echo will exceed the threshold value, namely, the probability that the normal echo will be removed by mistake becomes constant. As the total electric power in FIG. 11, the total electric power calculated from all frequency components may be used or the total electric power removing the ground echo component with the Doppler frequency in the proximity of 0 may be used.

If the threshold value is set by the described method, for example, when the reception strength of an atmospheric echo is weak, the effect of an abnormal echo is easily received, but the abnormal echo determination threshold value becomes low and thus it is made possible to remove more abnormal echo components. In contrast, when the reception strength of an atmospheric echo is comparatively strong, the threshold value becomes large and thus the probability that the atmospheric echo which is strong will be determined an abnormal echo by mistake becomes low, so that it is made possible to use a large number of atmospheric echo components.

Figure 12:
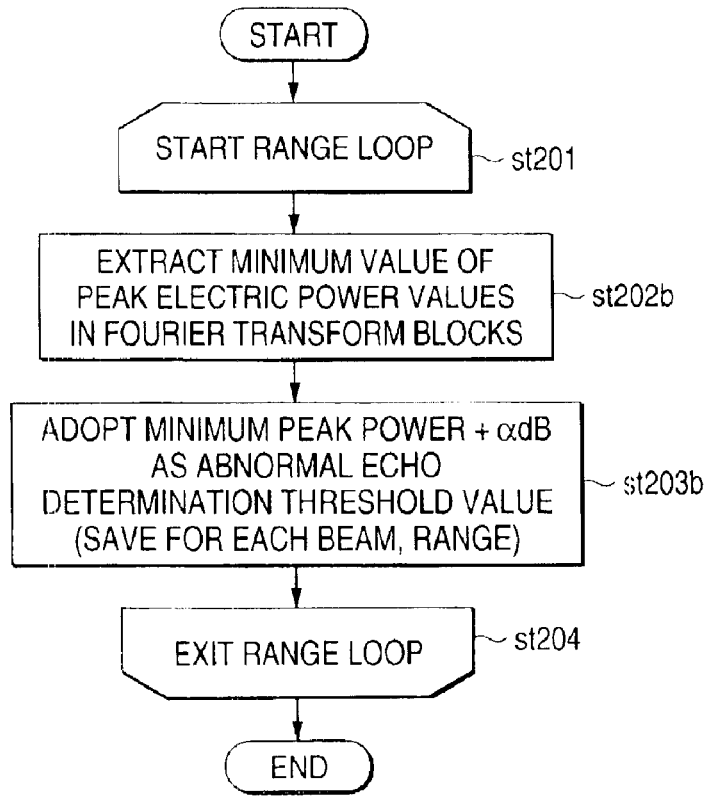
FIG. 12 is a flowchart to show a flow of another threshold value setting algorithm in the radar signal processing method of the third embodiment of the invention.

In FIG. 11, the abnormal echo determination threshold value is set using the total electric power values; as in FIG. 12, the abnormal echo determination threshold value may be set using the peak value of power spectrum. In FIG. 12, step st202b is used in place of step st202 in FIG. 11, whereby the minimum peak power value is extracted from the peak power values at a plurality of times. Step st203b is used in place of step st203, whereby the power level resulting from adding a margin to the peak power value is set as the threshold value for abnormal echo determination. In FIGS. 11 and 12, the abnormal echo determination threshold value is set by performing similar processing except that the peak electric power is used in place of the total electric power.

The threshold value setting process in FIG. 11 or 12 may be placed in an appropriate point in the flow of the radar signal processing. For example, to use the radar signal processing method previously described with reference to FIG. 5, it is possible to enter the threshold value setting process just after st007. Alternatively, the threshold value setting process may be entered just after st012 and the setup threshold value may be used for the signal processing at the next time. In the invention, the stage entering the threshold value setting process is not limited.

According to the embodiment, the threshold value responsive to the strength of the atmospheric echo is used to make abnormal echo determination, so that it is made possible to precisely remove the abnormal echo with low probability that the atmospheric echo will be removed by mistake, and the observation accuracy can be kept high.

(Fourth Embodiment)

In the third embodiment, the abnormal echo determination threshold value is changed using the observation data. Since the migratory bird flying frequency depends on the season and the time, the abnormal echo determination threshold value may be changed based on the date and time. Specifically, the time period over which migratory birds move is constant every year and moreover the migratory birds often move in the nighttime during which the migratory birds are hard to see from a foreign enemy. Thus, the abnormal echo determination threshold value may be made low for lessening the residue of an abnormal echo in the time period over which migratory birds move, for example, in the nighttimes in spring and autumn. In other dates and times, if birds pass through the observation range, the frequency is very low and thus the abnormal echo can be removed by performing quality control processing after signal processing performed formerly, so that the abnormal echo determination threshold value can be made high for lowering the probability that the normal echo will be removed by mistake.

Figure 13:
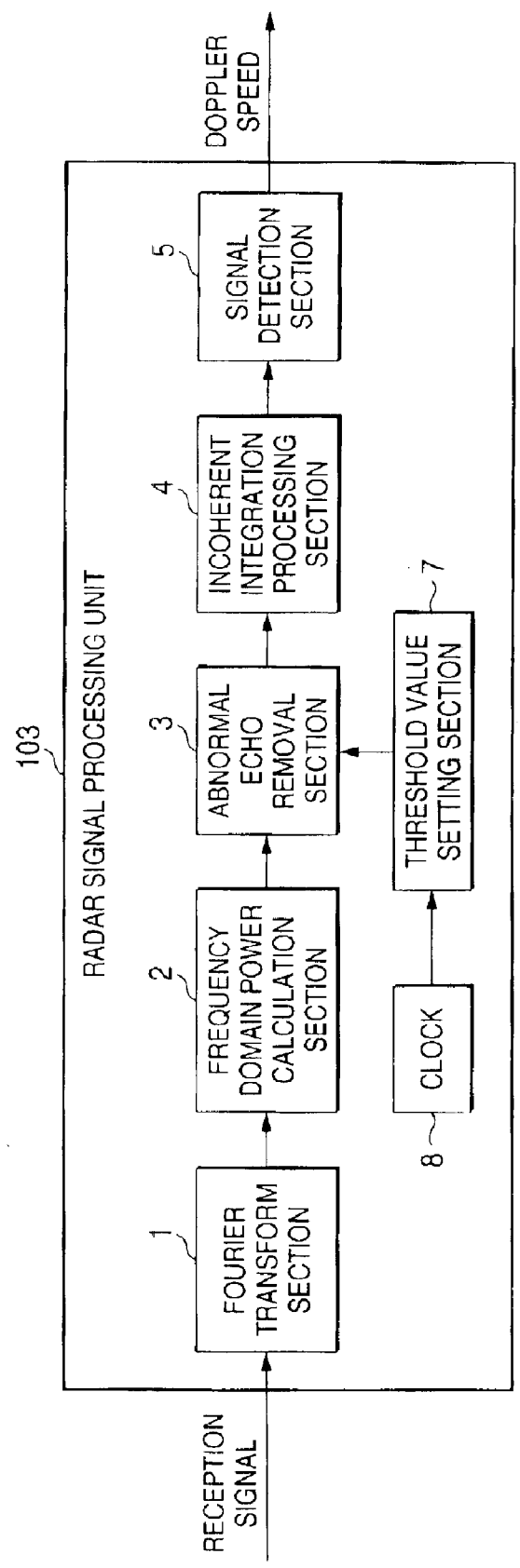
FIG. 13 is a block diagram to show the configuration of a radar signal processing unit of a fourth embodiment of the invention.

FIG. 13 is a block diagram to show a configuration example of a radar signal processing unit for such a purpose. In the figure, numeral 8 denotes a clock. Parts identical with those previously described with reference to FIG. 1 or 10 are denoted by the same reference numerals in FIG. 13. Date and time data output from the clock 8 is passed to a threshold value setting section 7, which then outputs the threshold value preset for each date and time to an abnormal echo removal section 3, which then uses the threshold value input from the threshold value setting section 7 to determine whether or not the echo is an abnormal echo relative to the power spectrum input from a frequency domain power calculation section 2. If the echo is determined abnormal, the abnormal echo removal section 3 removes the power spectrum data. In other points, the operation of the radar signal processing unit is the same as that of the radar signal processing unit previously described with reference to FIG. 10.

Figure 14:
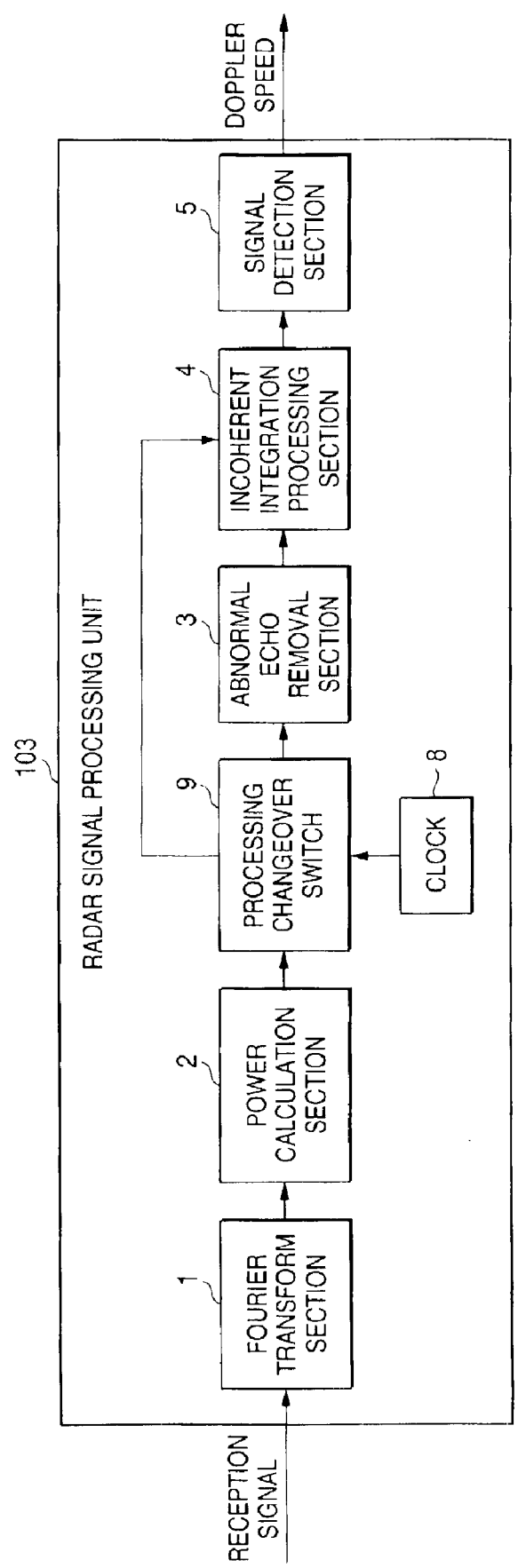
FIG. 14 is a block diagram to show the configuration of another radar signal processing unit of the fourth embodiment of the invention.

FIG. 14 shows another example of the radar signal processing unit in FIG. 13. In FIG. 14, numeral 9 denotes a processing changeover switch. Parts identical with those previously described with reference to FIG. 1, 10, or 13 are denoted by the same reference numerals in FIG. 14. In FIG. 13, the threshold value is changed according to the date and time; in FIG. 14, processing of the abnormal echo removal section 3 is turned on/off according to the date and time. For example, the processing changeover switch is turned on for the abnormal echo removal section 3 to perform processing only in the nighttimes in the migratory season, and in other dates and times, the processing changeover switch is turned off so that the abnormal echo removal section 3 does not perform processing.

As described above, the threshold value is changed according to the date and time, whereby particularly the abnormal echo can be well removed or abnormal echo removal processing is turned on/off, whereby the abnormal echo is removed only when the effect of the abnormal echo caused by the migratory birds appears largely. Therefore, in the dates and times when the effect of migratory birds is small, removing the normal echo by mistake is eliminated and the number of incoherent integrations does not lessen and thus the detection probability of the normal echo is not decreased and it is made possible to maintain the data acquisition rate.

(Fifth Embodiment)

Figure 15:
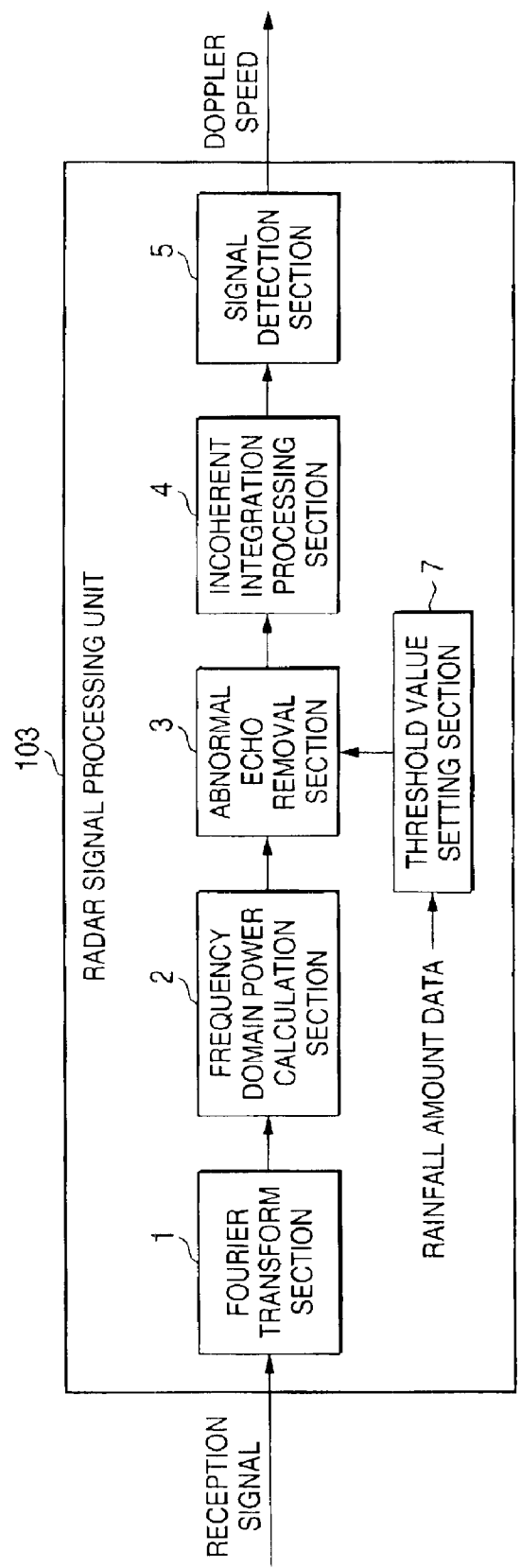
FIG. 15 is a block diagram to show the configuration of a radar signal processing unit of a fifth embodiment of the invention.

In the fourth embodiment, the radar signal processing method is changed according to the date and time, but the migration of migratory birds also depends on the weather. In a fifth embodiment of the invention, the radar signal processing method is changed according to the weather. FIG. 15 is a block diagram to show the configuration of a radar signal processing unit of the fifth embodiment of the invention. Parts identical with those previously described with reference to FIG. 10 are denoted by the same reference numerals in FIG. 15. In FIG. 15, a threshold value setting section 7 inputs rainfall amount data and outputs a threshold value changing depending on the rainfall strength to an abnormal echo removal section 3. When the rainfall amount is large, the possibility that migratory birds will come flying is low and thus the threshold value is set large so as not to remove the normal echo by mistake. In contrast, when no rainfall occurs, there is a possibility that migratory birds will come flying and thus the threshold value is set small so that an abnormal echo can be removed.

Figure 16:
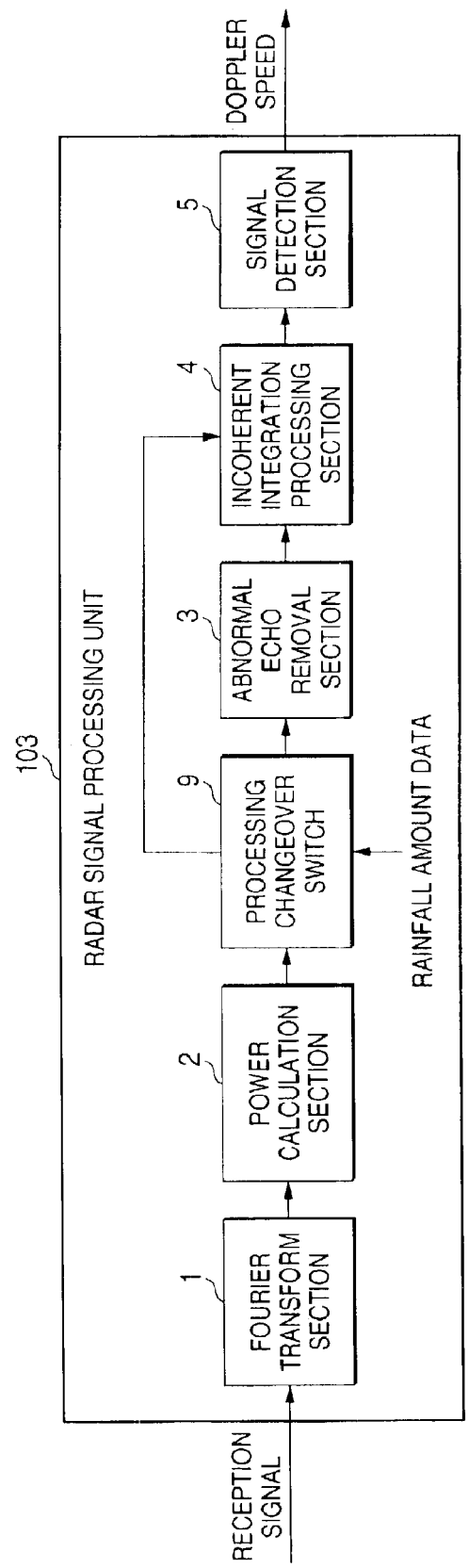
FIG. 16 is a block diagram to show the configuration of another radar signal processing unit of the fifth embodiment of the invention.

A block diagram of FIG. 16 is a modification of FIG. 15. Processing of the abnormal echo removal section 3 is turned on/off according to the rainfall amount data. That is, when a rainfall occurs, processing of the abnormal echo removal section 3 is turned off; when no rainfall occurs, processing of the abnormal echo removal section 3 is turned on.

As the rainfall amount data, data observed with a general rain gage may be used of the rainfall amount strength measured with a rainfall radar installed aside from the wind speed measurement radar may be used; in the invention, the observation method of the rainfall amount data is not limited.

If the characteristics of migratory bird flying depends on weather data other than the rainfall amount, such data may also be input to the threshold value setting section 7.

According to the fifth embodiment of the invention, when a rainfall occurs, it is determined that migratory birds do not come flying, and the signal processing is controlled, so that removing the normal echo by mistake at the rainfall time is eliminated.

(Sixth Embodiment)

In the fifth embodiment, the rainfall amount data is used to control the abnormal echo removal processing at the rainfall time. In a sixth embodiment of the invention, the presence or absence of a rainfall is determined from data observed with a radar.

Figure 17:
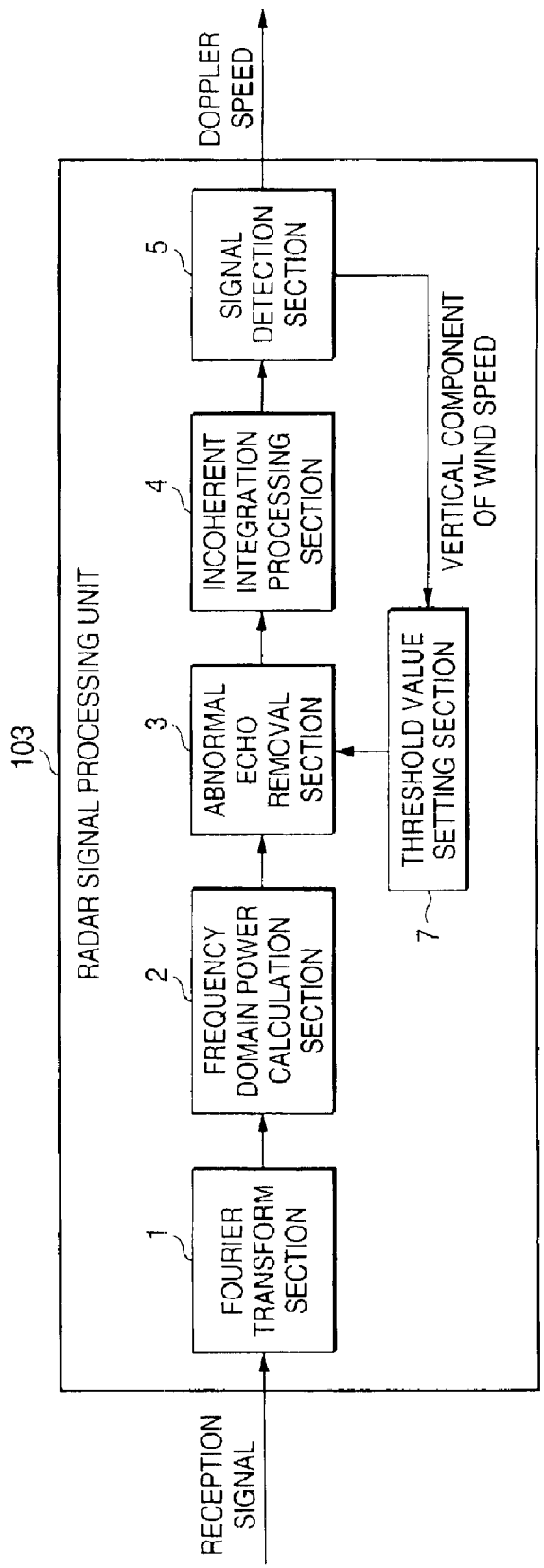
FIG. 17 is a block diagram to show the configuration of a radar signal processing unit of a sixth embodiment of the invention.
Figure 18:
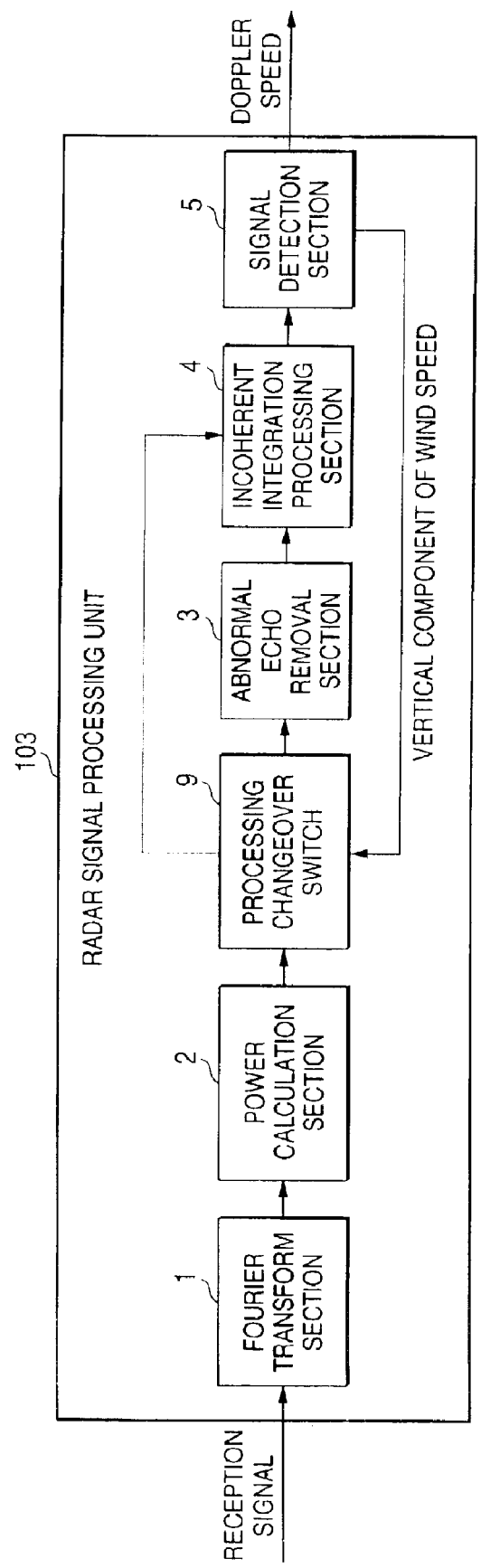
FIG. 18 is a block diagram to show the configuration of another radar signal processing unit of the sixth embodiment of the invention.

FIGS. 17 and 18 are block diagrams each to show the configuration of a radar signal processing unit of the seventh embodiment of the invention. Parts identical with those previously described with reference to the above Figures are denoted by the same reference numerals in FIGS. 17 and 18. Next, the operation is as follows: Of Doppler velocity data output from a signal detection section 5, the Doppler velocity observed with a beam directed toward the zenith direction is input to a processing changeover switch 9. If a rainfall does not occur, generally the wind speed in the vertical direction is about 1 to 2 m/s. In contrast, the raindrop falling speed becomes larger than the wind speed. It is considered that migratory birds fly horizontally in most cases. Therefore, if the Doppler velocity of the zenith beam is large in the approaching direction, it can be determined that a rainfall occurs and migratory birds do not pass through the sky. Then, if the Doppler velocity is large in the approaching direction, the radar signal processing unit in FIG. 17 increases the abnormal echo determination threshold value or if the Doppler velocity is large in the approaching direction, the radar signal processing unit in FIG. 18 turns off processing of an abnormal echo removal section 3.

To obtain the wind speed in the vertical direction, a beam need not necessarily be directed toward the zenith direction for observation. For example, letting Doppler velocitys obtained by observation in the east direction and the west direction at zenith angle θ be Ve and Vw, the vertical component of the wind speed, w, can be calculated according to the following expression (1):

$$w = (Ve + Vw)/2 \cos \theta \qquad (1)$$

Figure 20:
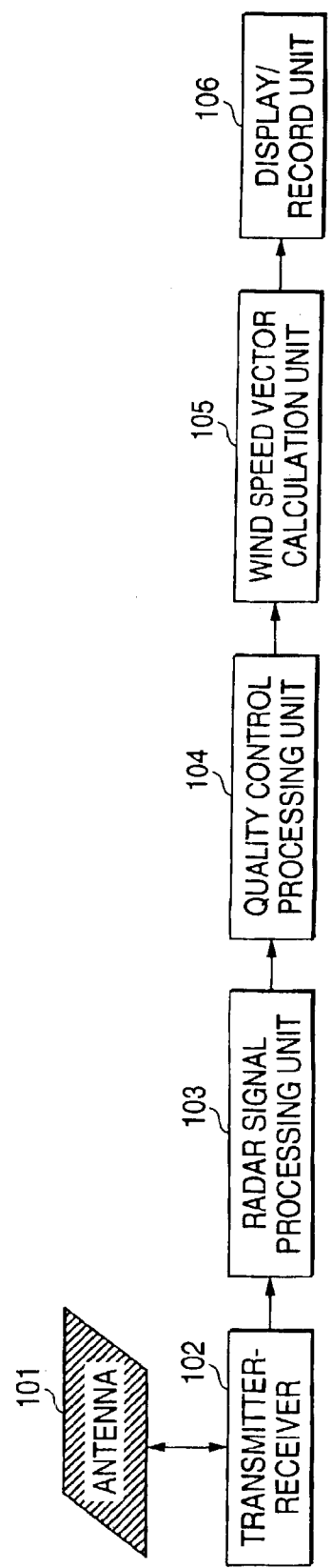
FIG. 20 is a block diagram to show the configuration of a general wind profiler in a related art.
Figure 21:
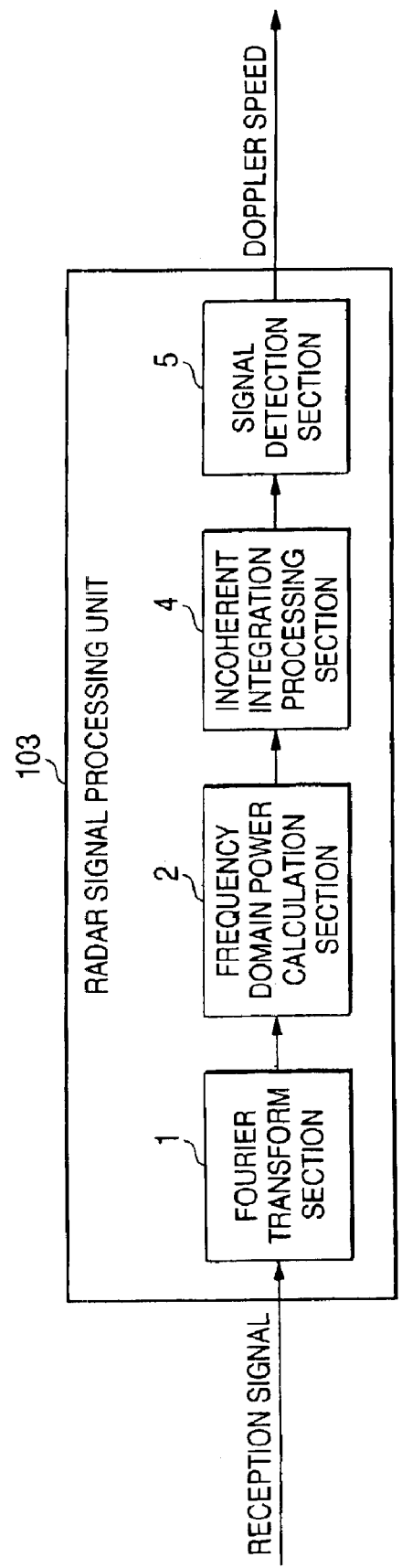
FIG. 21 is a block diagram to show the configuration of a radar signal processing unit of the wind profiler in the related art.
Figure 22A:
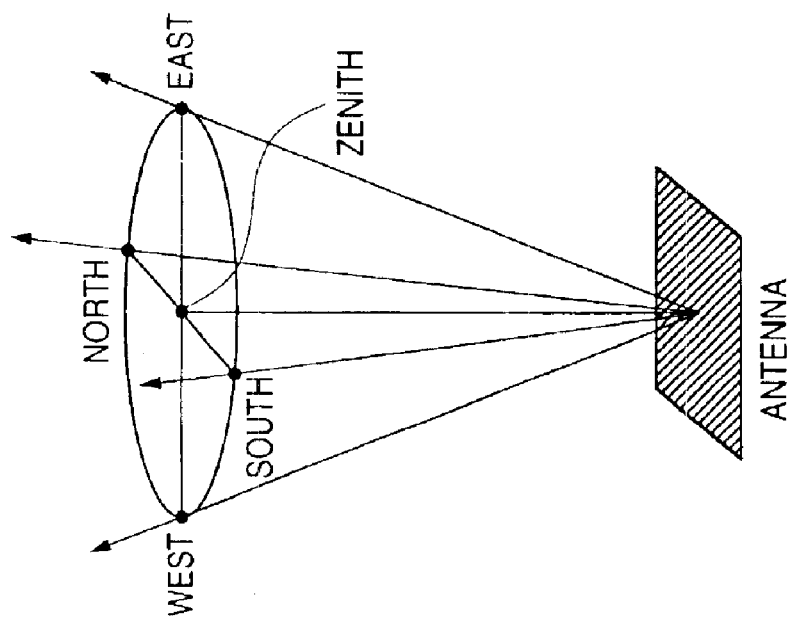
FIGS. 22A and 22B are drawings to schematically show the principle of calculating a wind vector in the wind profiler.
Figure 22B:
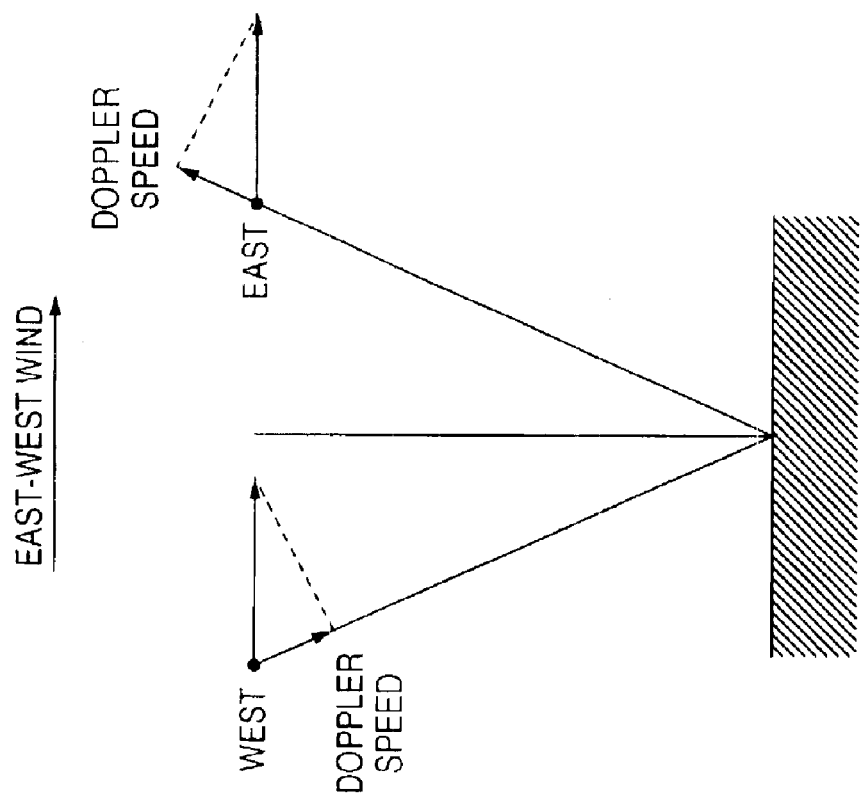
Figure 23:
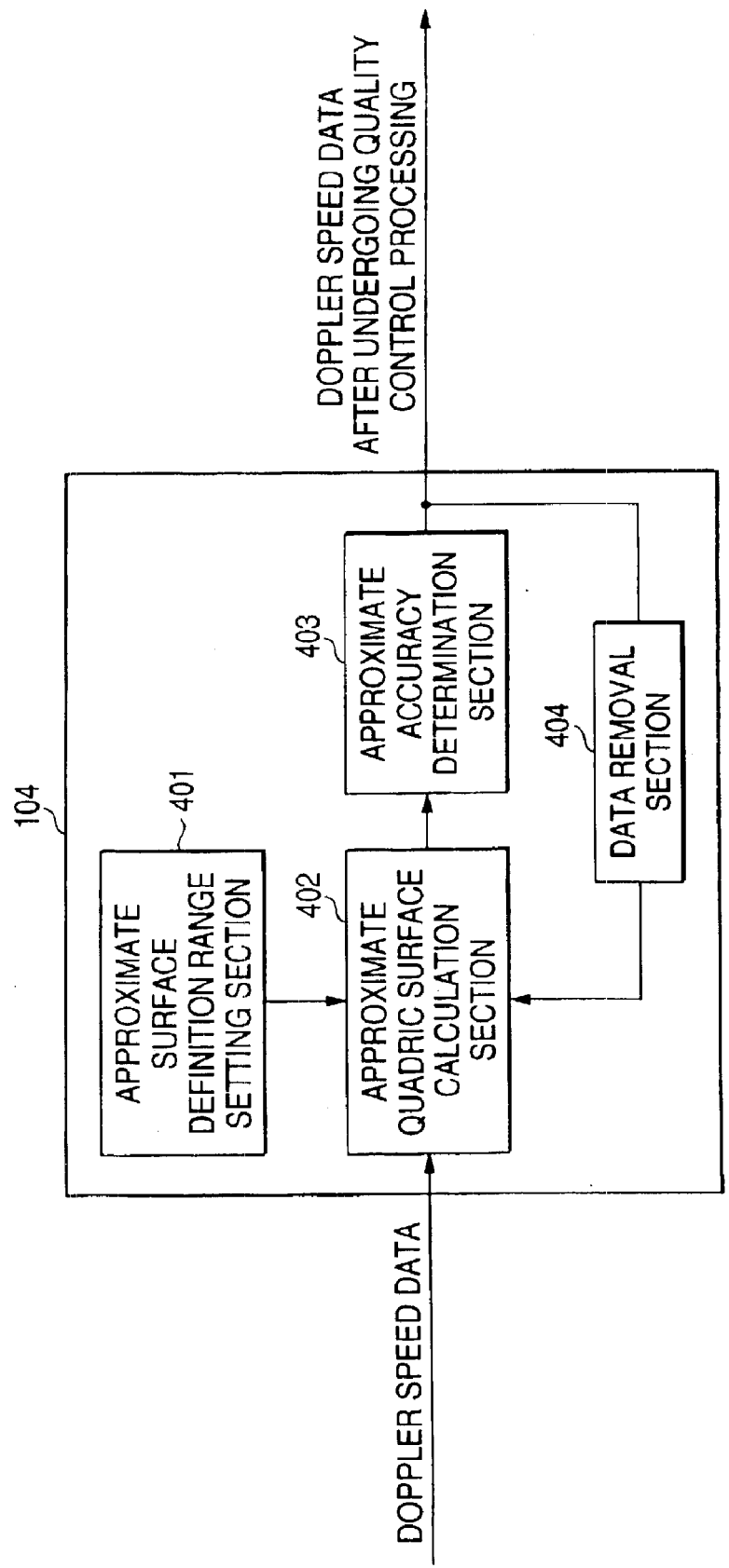
FIG. 23 is a block diagram to show a configuration example of a quality control processing unit of a wind profiler in a related art.

The calculation like expression (1) may be performed by the signal detection section 5 or the vertical component of a wind vector calculated by a wind vector calculation unit in FIG. 20 may be used.

According to the sixth embodiment, if the rainfall amount data observed with another unit is not input, the presence or absence of a rainfall is determined and the operation of the abnormal echo removal section 3 is controlled according to the determination result, so that the need for data input from a different unit is eliminated and appropriate abnormal echo removal processing is made possible in the simple configuration.

(Seventh Embodiment)

Figure 19:
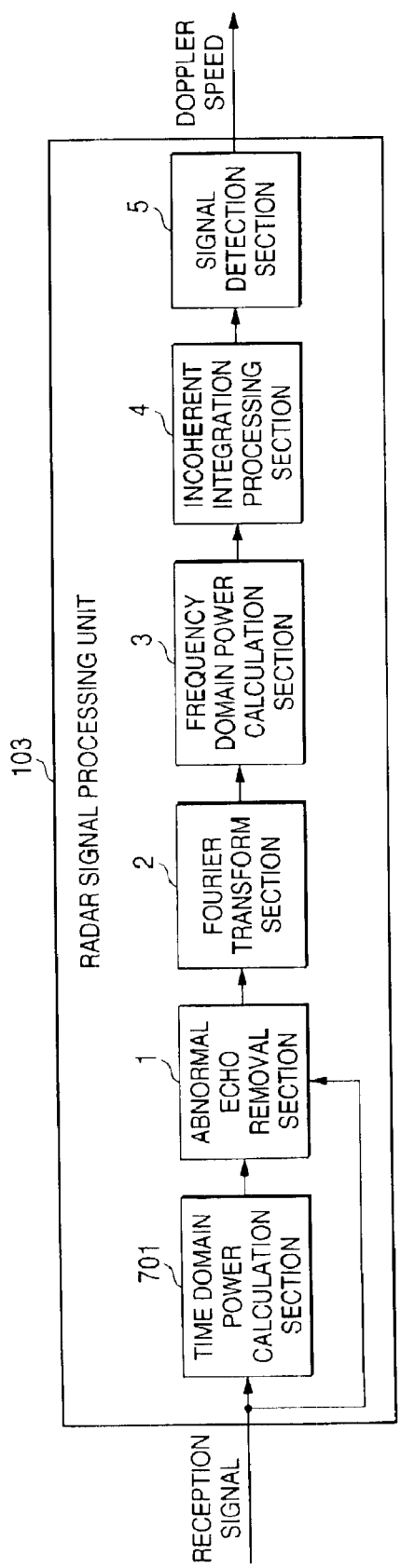
FIG. 19 is a block diagram to show the configuration of a radar signal processing unit of a seventh embodiment of the invention.

In the embodiments described above, an abnormal echo is determined for the data provided by converting a received signal in a time series domain into a frequency domain. However, the presence or absence of an abnormal echo is determined based on the power value and thus can also be determined for the time series data before being converted into the frequency domain. FIG. 19 is a block diagram to show the configuration of a radar signal processing unit of a seventh embodiment of the invention. In the figure, numeral 701 denotes a time domain power calculation section.

Next, the operation is as follows: The time domain power calculation section 701 separates reception data of time series data in a setup time range and calculates the total electric power in the time range. An abnormal echo removal section 1 compares the total electric power output from the time domain power calculation section 701 with a preset threshold value. If the total electric power is greater than the threshold value, the time series data in the time range is removed from the received signal. To remove the time series data, the data may be set to 0 or a mark indicating that the data is missing data may be put on the data. The subsequent processing, namely, processing on and after a Fourier transform section 2 is the same as the operation in the above-described embodiments.

Setting of the time range in calculation of the total electric power in the time domain power calculation section 701 may be the same as a time window when the Fourier transform section 2 executes Fourier transform or may be entirely different time range setting. If the same time range setting is adopted, if the total electric power is calculated in the time domain as in the seventh embodiment or if the total electric power is calculated in the frequency domain as in the above-described embodiments, both become equal. In contrast, in the seventh embodiment, it is also made possible to make the time range setting different from the time window when the Fourier transform is performed. Thus, for example, if an abnormal echo occurs intermittently in a shorter time than the time length of the Fourier transform processing, the time range for calculating the total electric power is set short, whereby only the data for the time when an abnormal echo exists can be removed precisely and it is made possible to minimize removal of the normal echo.

The time domain power calculation section 701 may calculate average power in separated time range in place of the total electric power, because the average power results from dividing the total electric power by the number of time points in the separated time range and if the abnormal echo determination threshold value divided by the number of time points is used, there is no substantial difference as the principle of removal processing.

According to the invention as in aspect 1, the power value before incoherent integration is compared with the threshold value, whereby an abnormal echo and atmospheric echo are discriminated from each other and the abnormal echo is removed, so that only the abnormal echoes caused by migratory birds occurring intermittently are removed and only the normal echo of the atmospheric echo is used to find the physical quantity of the atmosphere, so that precise measurement is made possible.

According to the invention as in aspect 2, the power value provided by integrating the power spectra obtained on the frequency axis is used, whereby a similar advantage to that provided according to aspect 1 can be provided.

According to the invention as in aspect 3, the total electric power value is calculated except for a low frequency domain in which a ground echo is prominent, so that if a strong ground echo is mixed, it is made possible to precisely determine whether or not an abnormal echo caused by migratory birds is mixed.

According to the invention as in aspect 4, only the power value at the point of frequency 0 is excluded from the total electric power value provided by integrating the power spectra in all Doppler frequency range, thereby calculating the total electric power value excluding the ground echo, so that it is made possible to provide a similar advantage to that provided according to aspect 3 by performing simple processing.

According to the invention as in aspect 5, the extracted value of the peak value of the power spectra provided on the frequency axis is used as the power value of the received signal, so that a similar advantage to that provided according to aspect 1 can be provided.

According to the invention as in aspect 6, the power value calculated from time series data is compared with the threshold value, whereby an abnormal echo and atmospheric echo are discriminated from each other and the abnormal echo is removed, so that only the abnormal echoes caused by migratory birds occurring intermittently are removed and only the normal echo of the atmospheric echo is used to find the physical quantity of the atmosphere, so that precise measurement is made possible.

According to the invention as in aspect 7, the threshold value for abnormal echo determination is adjusted according to the season or time, whereby in the dates and times when the effect of migratory birds is small, removing the normal echo by mistake is eliminated and the number of incoherent integrations does not lessen and thus the detection probability of the normal echo can be maintained and it is made possible to maintain the data acquisition rate as a result.

According to the invention as in aspect 8, abnormal echo terminal is turned on or off according to the season or time, whereby in the dates and times when the effect of migratory birds is small, removing the normal echo by mistake is eliminated and the number of incoherent integrations does not lessen and thus the detection probability of the normal echo can be maintained and it is made possible to maintain the data acquisition rate as a result.

According to the invention as in aspect 9, considering the characteristic of migratory birds, abnormal echo processing is turned on at the nighttime in the season in which migratory birds come flying and at other times, the abnormal echo processing is turned off, so that it is made possible to provide a similar advantage to that provided according to aspect 8.

According to the invention as in aspect 10, the threshold value for abnormal echo determination is adjusted in response to the rainfall strength, so that removing the normal echo by mistake at the rainfall time can be eliminated.

According to the invention as in aspect 11, when a rainfall occurs, it is determined that migratory birds do not come flying, and radar signal processing is controlled, so that removing the normal echo by mistake at the rainfall time can be eliminated.

According to the invention as in aspect 12, the threshold value for abnormal echo determination is adjusted in response to the drop speed of raindrops observed with a radar, so that it is made possible to perform radar signal processing not removing the normal echo by mistake at the rainfall without input data from another apparatus.

According to the invention as in aspect 13, whether or not a rainfall occurs is determined from the observation data of a radar and the operation of the abnormal echo removal section is controlled according to the determination result, so that it is made possible to perform radar signal processing not removing the normal echo by mistake at the rainfall without input data from another apparatus.

According to the invention as in aspect 14, an abnormal echo and atmospheric echo are discriminated from each other and the abnormal echo is removed, so that only the abnormal echoes caused by migratory birds occurring intermittently are removed and only the normal echo of the atmospheric echo is used to find the physical quantity of the atmosphere, so that precise measurement is made possible.

According to the invention as in aspect 15, if a strong ground echo is mixed, whether or not an abnormal echo caused by migratory birds is mixed is determined precisely, only the abnormal echoes caused by migratory birds occurring intermittently are removed, and only the normal echo of the atmospheric echo is used to find the physical quantity of the atmosphere, so that precise measurement is made possible.

According to the invention as in aspect 16, an abnormal echo and atmospheric echo are discriminated from each other and the abnormal echo is removed, so that only the abnormal echoes caused by migratory birds occurring intermittently are removed and only the normal echo of the atmospheric echo is used to find the physical quantity of the atmosphere, so that precise measurement is made possible.

According to the invention as in aspect 17, an abnormal echo and atmospheric echo are discriminated from each other and the abnormal echo is removed, so that only the abnormal echoes caused by migratory birds occurring intermittently are removed and only the normal echo of the atmospheric echo is used to find the physical quantity of the atmosphere, so that precise measurement is made possible and abnormal echo determination is made in batch at all distances and thus the operation time can be shortened as compared with that for making abnormal echo determination for each distance.

According to the invention as in aspect 18, an abnormal echo and atmospheric echo are discriminated from each other and the abnormal echo is removed, so that only the abnormal echoes caused by migratory birds occurring intermittently are removed and only the normal echo of the atmospheric echo is used to find the physical quantity of the atmosphere, so that precise measurement is made possible and abnormal echo determination is made in batch at all distances and thus the operation time can be shortened as compared with that for making abnormal echo determination for each distance.

According to the invention as in aspect 19, the threshold value responsive to the strength of the atmospheric echo is used to make abnormal echo determination, so that it is made possible to precisely remove the abnormal echo with low probability that the atmospheric echo will be removed by mistake, and the observation accuracy can be kept high.

According to the invention as in aspect 20, the threshold value responsive to the strength of the atmospheric echo is used to make abnormal echo determination, so that it is made possible to precisely remove the abnormal echo with low probability that the atmospheric echo will be removed by mistake, and the observation accuracy can be kept high.

What is claimed is:

1. A radar signal processing unit, comprising:
   a Fourier transform section configured to execute a Fourier transform of a received signal to a frequency signal,
   a frequency domain power calculation section configured to calculate a power spectrum of electric power for each frequency from the frequency signal,
   an abnormal echo removal section configured to determine the presence of an abnormal echo based on a power value of the power spectrum, and to output only a power spectrum not corresponding to the abnormal echo, said abnormal echo removal section also configured to perform processing in accordance with a first range loop,
   an incoherent processing section configured to perform an incoherent integration of the power spectrum not corresponding to the abnormal echo and averaging, said incoherent processing section configured to perform said incoherent integration in accordance with a second range loop, and
   a signal detection section configured to calculate an atmospheric physical quantity from the incoherent-integrated power spectrum.

2. The radar signal processing unit as claimed in claim 1, wherein
   said abnormal echo removal section is configured to use an integration value of power spectrum on a frequency axis as the power value of the power spectrum, and
   if the integration value exceeds a threshold value, said abnormal echo removal section is configured to determine that an abnormal echo is included, and to output only the power spectrum not corresponding to the abnormal echo.

3. The radar signal processing unit as claimed in claim 2, wherein
   the power value of the power spectrum is the integration value of the power spectrum on the frequency axis except for a frequency range in which a ground echo component is prominent.

4. The radar signal processing unit as claimed in claim 2, wherein
   the power value of the power spectrum is the integration value of the power spectrum on the frequency axis except for components of frequency 0.

5. The radar signal processing unit as claimed in claim 1, wherein
   said abnormal echo removal section is configured to use a peak value of the power spectrum as the power value of the power spectrum, and
   if the peak value exceeds a threshold value, said abnormal echo removal section is configured to determine that an abnormal echo is included, and to output only the power spectrum not corresponding to the abnormal echo.

6. A radar signal processing unit, comprising:
   a time domain power calculation section configured to calculate a total electric power of a received signal in a given time range,
   an abnormal echo removal section configured to determine that the received signal in the given time range is an abnormal echo, and to output the received signal not corresponding to the abnormal echo if the total electric power exceeds a threshold value, said abnormal echo removal section also configured to perform processing in accordance with a first range loop,
   a Fourier transform section configured to execute a Fourier transform of the received signal not corresponding to the abnormal echo to a frequency signal,
   a frequency domain power calculation section configured to calculate a power spectrum of the electric power for each frequency from the frequency signal,
   an incoherent processing section configured to perform an incoherent integration of the power spectrum and to perform an averaging, said incoherent processing section configured to perform said incoherent integration in accordance with a second range loop, and
   a signal detection section configured to calculate an atmospheric physical quantity from the incoherent-integrated power spectrum.

7. The radar signal processing unit as claimed in claim 6, further comprising:
   a threshold value setting section configured to set the threshold value in response to a date or time condition.

8. The radar signal processing unit as claimed in claim 6, wherein
whether or not abnormal echo removal processing is to be performed can be specified in response to a date or time condition.

9. The radar signal processing unit as claimed in claim 7, wherein
the date or time condition is a season in which a large number of migratory birds come flying and nighttime.

10. The radar signal processing unit as claimed in claim 6, further comprising:
a threshold value setting section configured to set the in response to rainfall strength.

11. The radar signal processing unit as claimed in claim 6, wherein
whether or not abnormal echo removal processing is to be performed can be specified in response to rainfall strength.

12. The radar signal processing unit as claimed in claim 6, wherein
said signal detection section is configured to calculate a wind speed in a vertical direction, and
the threshold value for the abnormal echo determination is changed in response to a value of the wind speed.

13. The radar signal processing unit as claimed in claim 12, wherein
the presence of a rainfall is determined based on the wind speed in a vertical direction calculated by said signal detection section, and
if a rainfall exists, abnormal echo removal processing is not performed.

14. A radar signal processing method, comprising the steps of:
executing a first range loop, said step of executing a first range loop including, for each of a plurality of ranges, the steps of
extracting a signal in one time range from a received signal,
executing a Fourier transform to transform the extracted signal into frequency domain data,
calculating a power value for each frequency of the frequency domain data and finding a power spectrum of said extracted signal, and
integrating electric power of the power spectrum on a frequency axis to calculate total electric power of the extracted signal;
executing a second range loop for each of the plurality of ranges determined not to include an abnormal echo, said executing a second range loop including the steps of
determining whether an abnormal echo is mixed in the extracted signal by determining if the total electric power exceeds a preset threshold value, and
performing incoherent integration of the power spectrum;
detecting an atmospheric echo from the power spectrum; and
calculating the physical quantity of the atmosphere.

15. The radar signal processing method as claimed in claim 14, wherein
said step of integrating electric power excludes integration of a fixed clutter area of a ground echo component.

16. The radar signal processing method as claimed in claim 14, wherein
the power values of the power spectra provided at a plurality of times are compared with each other, any other power value than at the time having a relatively high power value is extracted, and
the extracted power value is multiplied by a predetermined coefficient to provide the threshold value used for abnormal echo determination.

17. The radar signal processing method as claimed in claim 16, wherein
the minimum power value of the total electric power or the peak electric power calculated from the power spectra provided at a plurality of times within a given time period at each distance is extracted as the electric power of an atmospheric echo, and
the value resulting from multiplying the extracted minimum power value by a preset coefficient is set as the threshold value.

18. A radar signal processing method, comprising steps of:
executing a first range loop, said step of executing a first range loop including, for each of a plurality of ranges, the steps of
extracting a signal in one time range from a received signal,
executing a Fourier transform to transform the extracted signal into frequency domain data,
calculating a power value for each frequency of the frequency domain data and finding a power spectrum of said extracted signal, and
calculating a peak electric power of the power spectrum;
executing a second range loop for each of the plurality of ranges determined not to include an abnormal echo, said executing a second range loop including the steps of
determining whether an abnormal echo is mixed in the extracted signal by determining whether the peak electric power exceeds a preset threshold value, and
performing incoherent integration of the power spectrum;
detecting an atmospheric echo from the power spectrum; and
calculating the physical quantity of the atmosphere.

19. A radar signal processing method, comprising steps of:
executing a first range loop, said step of executing a first range loop including, for each of a plurality of ranges, the steps of
extracting a signal in one time range from a received signal,
executing a Fourier transform to transform the extracted signal into frequency domain data,
calculating a power value for each frequency of the frequency domain data and finding a power spectrum of said extracted signal,
integrating electric power of the power spectrum on a frequency axis to calculate a total electric power;
determining if a maximum value of the total electric power for each range exceeds a preset threshold value;
executing a second range loop for each of the plurality of ranges where said maximum value of the total electric power does not exceed the preset threshold value, said step of executing a second range loop including performing incoherent integration on the power spectrum;
detecting an atmospheric echo from the power spectrum; and
calculating the physical quantity of the atmosphere.

20. A radar signal processing method, comprising steps of:
- executing a first range loop, said step of executing a first range loop including, for each of a plurality of ranges, the steps of
  - extracting a signal in one time range from a received signal,
  - executing a Fourier transform to transform the extracted signal into frequency domain data,
  - calculating a power value for each frequency of the frequency domain data and finding a power spectrum,
  - calculating a peak power value of the power spectrum;
- determining if a maximum value of the peak power value for each range exceeds a preset threshold value;
- executing a second range loop for each of the plurality of ranges where said maximum value of the peak power does not exceed the preset threshold value, said step of executing a second range loop including performing incoherent integration on the power spectrum;
- detecting an atmospheric echo from the power spectrum; and
- calculating the physical quantity of the atmosphere.

* * * * *